United States Patent
Sudhan S et al.

(10) Patent No.: US 11,335,928 B2
(45) Date of Patent: May 17, 2022

(54) ELECTROCHEMICAL IMPEDANCE SPECTROSCOPY ("EIS") ANALYZER AND METHOD OF USING THEREOF

(71) Applicant: BLOOM ENERGY CORPORATION, San Jose, CA (US)

(72) Inventors: Karthick Sudhan S, Mumbai (IN); Bhavana Ganesh, Bangalore (IN); Abhishek Dudhmande, Thane West (IN); Ranganathan Gurunathan, Bangalore (IN); Ian Russell, Sunnyvale, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 138 days.

(21) Appl. No.: 16/799,371

(22) Filed: Feb. 24, 2020

(65) Prior Publication Data
US 2020/0194813 A1    Jun. 18, 2020

Related U.S. Application Data

(62) Division of application No. 14/853,030, filed on Sep. 14, 2015, now Pat. No. 10,573,910.

(51) Int. Cl.
*H01M 8/04537* (2016.01)
*H01M 8/04298* (2016.01)
(Continued)

(52) U.S. Cl.
CPC ..... *H01M 8/04649* (2013.01); *H01M 8/0491* (2013.01); *H01M 8/04305* (2013.01);
(Continued)

(58) Field of Classification Search
CPC ......... H01M 8/04649; H01M 8/04305; H01M 8/04589; H01M 8/04679; H01M 8/04753; H01M 8/0491; H01M 8/04992
See application file for complete search history.

(56) References Cited

U.S. PATENT DOCUMENTS 5,518,829 A    5/1996  Satake et al.
5,589,017 A   12/1996  Minh
(Continued)

FOREIGN PATENT DOCUMENTS

CN    106456947 A    2/2017
EP     3154621 A1   12/2015
(Continued)

OTHER PUBLICATIONS

International Search Report and Written Opinion of the International Searching Authority for International Application No. PCT/US2016/050255, dated Dec. 23, 2016, 10 pages.
(Continued)

*Primary Examiner* — Stewart A Fraser
(74) *Attorney, Agent, or Firm* — The Marbury Law Group PLLC

(57) ABSTRACT

Systems, methods, and devices of the various embodiments provide a hardware and software architecture enabling electrochemical impedance spectroscopy ("EIS") to be performed on multiple electrochemical devices, such as fuel cells, at the same time without human interaction with the electrochemical devices and to use EIS to dynamically monitor the performance of a fuel cell system. Embodiment methods may include determining an impedance of a set of fuel cells using electrochemical impedance spectroscopy, determining an ohmic polarization of the set of fuel cells from the impedance, determining a concentration polarization of the set of fuel cells from the impedance, comparing the ohmic polarization of the set of fuel cells to a first threshold, comparing the concentration polarization of the set of fuel cells to a second threshold, and initiating a corrective action when the ohmic polarization is above the first threshold or when the concentration polarization is below the second threshold.

14 Claims, 12 Drawing Sheets

(51) Int. Cl.
*H01M 8/04746* (2016.01)
*H01M 8/04664* (2016.01)
*H01M 8/04858* (2016.01)
*H01M 8/04992* (2016.01)

(52) U.S. Cl.
CPC ... *H01M 8/04589* (2013.01); *H01M 8/04679* (2013.01); *H01M 8/04753* (2013.01); *H01M 8/04992* (2013.01)

(56) References Cited

U.S. PATENT DOCUMENTS

| | | |
|---|---|---|
| 5,641,585 A | 6/1997 | Lessing et al. |
| 5,733,499 A | 3/1998 | Takeuchi et al. |
| 5,955,392 A | 9/1999 | Takeuchi et al. |
| 6,001,761 A | 12/1999 | Hata et al. |
| 6,361,892 B1 | 3/2002 | Ruhl et al. |
| 6,492,053 B1 | 12/2002 | Donelson et al. |
| 6,582,845 B2 | 6/2003 | Helfinstine et al. |
| 6,589,681 B1 | 7/2003 | Yamanis |
| 6,638,575 B1 | 10/2003 | Chen et al. |
| 6,691,095 B2 | 2/2004 | Singh et al. |
| 6,835,488 B2 | 12/2004 | Sasahara et al. |
| 7,045,237 B2 | 5/2006 | Sridhar et al. |
| 7,422,810 B2 | 9/2008 | Venkataraman et al. |
| 7,705,490 B2 | 4/2010 | Srinivasan et al. |
| 7,713,649 B2 | 5/2010 | Hickey et al. |
| 8,039,154 B2 | 10/2011 | Morita et al. |
| 8,173,063 B2 | 5/2012 | Zobl et al. |
| 8,440,362 B2 | 5/2013 | Richards et al. |
| 8,563,180 B2 | 10/2013 | Perry et al. |
| 8,652,697 B2 | 2/2014 | Gottmann et al. |
| 9,917,315 B2 * | 3/2018 | Aoki ............... H01M 8/04641 |
| 2003/0041445 A1 | 3/2003 | Jang et al. |
| 2003/0061182 A1 | 3/2003 | Singh et al. |
| 2005/0287402 A1 | 12/2005 | Maly et al. |
| 2006/0078788 A1 | 4/2006 | Ramschak |
| 2007/0009784 A1 | 1/2007 | Pal et al. |
| 2007/0172708 A1 | 7/2007 | Takebe et al. |
| 2007/0259256 A1 | 11/2007 | Le Canut et al. |
| 2007/0262648 A1 | 11/2007 | McKenzie |
| 2008/0075985 A1 | 3/2008 | Gottmann |
| 2008/0124590 A1 | 5/2008 | Ballantine et al. |
| 2008/0318089 A1 | 12/2008 | Schneider et al. |
| 2009/0075127 A1 | 3/2009 | Lienkamp et al. |
| 2009/0092882 A1 | 4/2009 | Kjeang et al. |
| 2009/0269625 A1 | 10/2009 | Odgaard et al. |
| 2010/0141262 A1 | 6/2010 | Watanabe et al. |
| 2010/0216043 A1 * | 8/2010 | Gottmann ......... H01M 8/04552 429/432 |
| 2011/0281185 A1 | 11/2011 | Sridhar et al. |
| 2011/0300461 A1 | 12/2011 | Manabe et al. |
| 2012/0217812 A1 | 8/2012 | Lee et al. |
| 2014/0009003 A1 | 1/2014 | Ballantine et al. |
| 2014/0093802 A1 | 4/2014 | Gottmann et al. |
| 2014/0358462 A1 | 12/2014 | Christophersen et al. |
| 2015/0024295 A1 | 1/2015 | Hibino et al. |
| 2015/0228990 A1 * | 8/2015 | Ballantine ......... H01M 8/04649 429/430 |
| 2015/0244011 A1 * | 8/2015 | Sudhan S ......... H01M 8/04649 429/430 |
| 2016/0054391 A1 * | 2/2016 | Won ..................... H01M 10/48 324/430 |
| 2016/0061902 A1 | 3/2016 | Jeong et al. |
| 2017/0077535 A1 | 3/2017 | Sudhan S et al. |

FOREIGN PATENT DOCUMENTS

| | | |
|---|---|---|
| JP | 2002-367650 | 12/2002 |
| JP | 2007048559 A | 2/2007 |
| JP | 2015043313 A | 3/2015 |
| JP | 2017512372 A | 8/2015 |
| JP | 2002367650 A | 12/2020 |
| KR | 20170018039 A | 2/2017 |

OTHER PUBLICATIONS

International Preliminary Report on Patentability from the International Searching Authority for International Application No. PCT/US2016/050255, dated Mar. 29, 2018, 7 pages.

Korean Office Communication from KIPO, Notification of Preliminary Rejection ("Office Action") for Korean Patent Application No. 10-2018-7003106, dated Mar. 14, 2019, 5 pages.

European Office Communication Pursuant to Rule 164(1) EPC and Supplementary European Search Report, for European Patent Application No. 16847064.9, dated Apr. 24, 2019, 14 pages.

Korean Office Communication from KIPO, Notification of Preliminary Rejection ("Office Action") for Korean Patent Application No. 10-2018-7003106, dated Jul. 31, 2019, 3 pages.

Matsuzaki, Y. et al., "The poisoning effect of sulfur-containing impurity gas on a SOFC anode: Part I. Dependence on temperature, time, and impurity concentration," Solid State Ionics, vol. 132, pp. 261-269, (2000).

O'Rourke, J. et al., "Estimating Air Flow Rates in a Fuel Cell System Using Electrochemical Impedance," ASME 2008 Dynamic Systems and Control Conference, Oct. 20-22, 2008 Ann Arbor, Michigan, USA, Conference Sponsors: Dynamic Systems and Control Division, *ASME 2008 Dynamic Systems and Control Conference, Parts A and B*, ISBN: 978-0-7918-4335-2, Paper No. DSCC2008-2172, pp. 497-503; 7 pages, https://doi.org/10.1115/DSCC2008-2172 (2009).

Japanese Office Communication from JPO for Japanese Patent Application No. 2018-510919, dated Jun. 16, 2020, 7 pages.

\* cited by examiner

ELECTROCHEMICAL IMPEDANCE SPECTROSCOPY ("EIS") ANALYZER AND METHOD OF USING THEREOF

BACKGROUND

Electrochemical devices, such as fuel cells, can convert energy stored in fuels to electrical energy with high efficiencies. In a fuel cell system, such as a solid oxide fuel cell (SOFC) system, an oxidizing flow is passed through the cathode side of the fuel cell while a fuel inlet flow is passed through the anode side of the fuel cell. The oxidizing flow is typically air, while the fuel flow can be a hydrocarbon fuel, such as methane, natural gas, pentane, ethanol, or methanol. The fuel cell enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

In order to optimize the operation of electrochemical devices, such as fuel cells, the polarization behavior and conductive properties of the electrode, electrolyte, and current carriers of the electrochemical device may be monitored to enable the oxidizing and fuel flows to be precisely regulated. In order to maintain proper operating conditions for electrochemical devices, such as fuel cells, it is desirable to continually monitor and adjust the electrochemical devices, but current methods for monitoring electrochemical devices, such as fuel cells, are inefficient, are not customizable, and involve human intervention which makes optimization and continual monitoring and adjustment difficult.

SUMMARY

The systems, methods, and devices of the various embodiments provide a hardware and software architecture enabling electrochemical impedance spectroscopy ("EIS") to be performed on multiple electrochemical devices, such as fuel cells, at once without human interaction with the electrochemical devices and to use EIS to dynamically monitor the performance of a fuel cell system. Systems and methods are further disclosed for monitoring a fuel cell system utilizing EIS. In various embodiments, the methods may include determining a single frequency to apply to a set of fuel cells, where fuel utilization of the set of fuel cells is dependent on imaginary impedance at the single frequency, determining the imaginary impedance of the set of fuel cells at the single frequency using electrochemical impedance spectroscopy, comparing the imaginary impedance of the set of fuel cells to a first threshold, and initiating a corrective action when the imaginary impedance is below the first threshold.

According to various embodiments, other methods may include determining a first frequency range to apply to a set of fuel cells, where the slope of the real impedance of the set of fuel cells versus frequency in the first frequency range is substantially the same as the slope of the real impedance of the set of fuel cells versus frequency of a second frequency range outside the first frequency range, determining the real impedance of the set of fuel cells over the first frequency range using electrochemical impedance spectroscopy, comparing the real impedance of the set of fuel cells to a first threshold, and initiating a corrective action when the real impedance is above the first threshold.

According to various embodiments, other methods may include determining an impedance of a set of fuel cells using electrochemical impedance spectroscopy, determining an ohmic polarization of the set of fuel cells from the impedance, determining a concentration polarization of the set of fuel cells from the impedance, comparing the ohmic polarization of the set of fuel cells to a first threshold, comparing the concentration polarization of the set of fuel cells to a second threshold, and initiating a corrective action when the ohmic polarization is above the first threshold or when the concentration polarization is below the second threshold.

DETAILED DESCRIPTION

Figure 1:
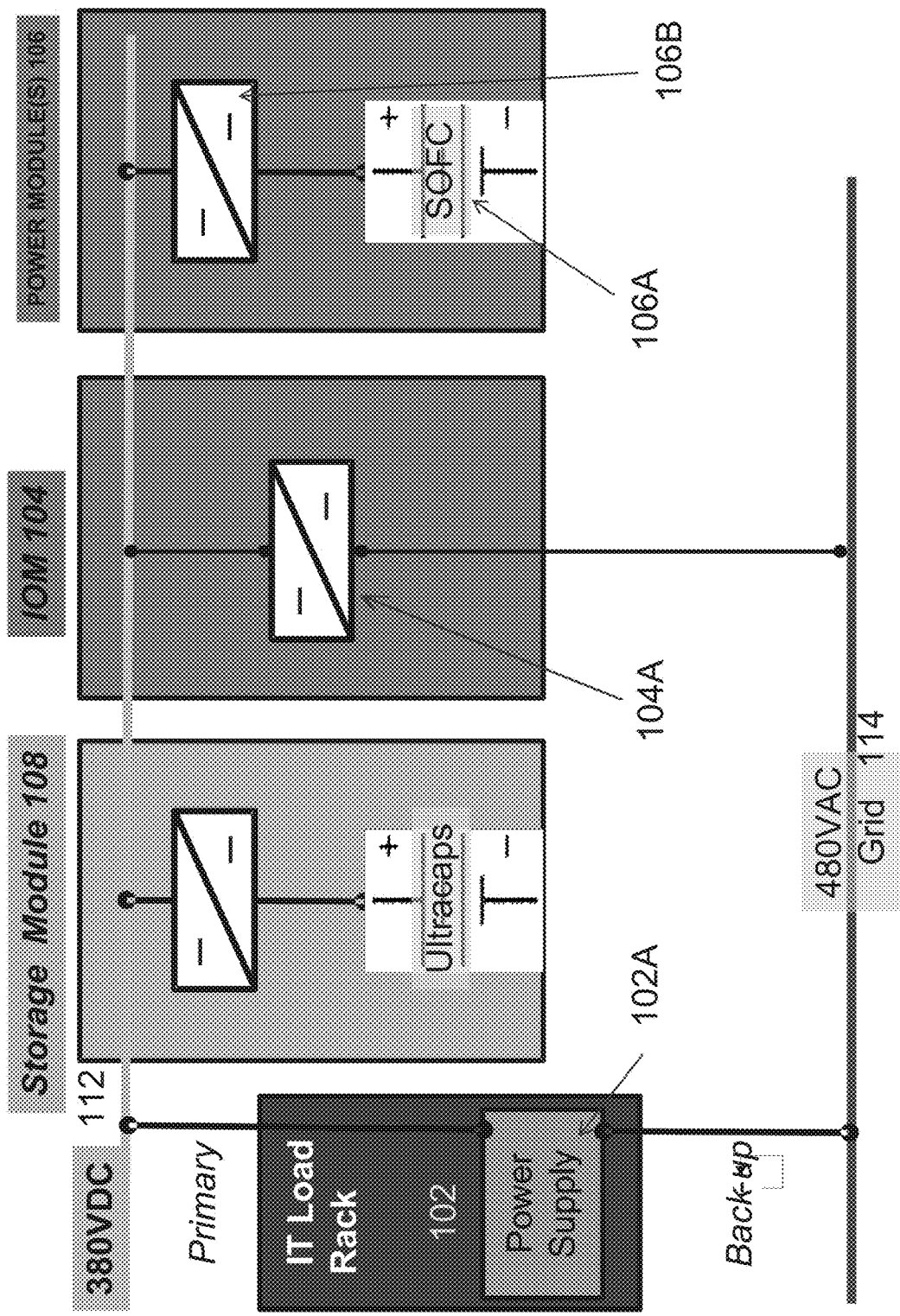
FIG. 1 is a block diagram illustrating a fuel cell system that can be used with the exemplary embodiments.

Referring to FIG. 1, one exemplary fuel cell system includes a DC load 102, such as an information technology ("IT") load (i.e., devices operating in an IT system which may include one or more of computer(s), server(s), modem(s), router(s), rack(s), power supply connections, and other components found in a data center environment), an input/output module (IOM) 104, and one or more power modules 106, as described in U.S. application Ser. No. 13/937,312 incorporated herein by reference in its entirety.

The IOM 104 may comprise one or more power conditioning components. The power conditioning components may include components for converting DC power to AC power, such as a DC/AC inverter 104A (e.g., a DC/AC inverter described in U.S. Pat. No. 7,705,490, incorporated herein by reference in its entirety), electrical connectors for AC power output to the grid, circuits for managing electrical transients, a system controller (e.g., a computer or dedicated control logic device or circuit), etc. The power conditioning components may be designed to convert DC power from the fuel cell modules to different AC voltages and frequencies. Designs for 208V, 60 Hz; 480V, 60 Hz; 415V, 50 Hz and other common voltages and frequencies may be provided.

Each power module 106 cabinet is configured to house one or more hot boxes. Each hot box contains one or more stacks or columns of fuel cells 106A (generally referred to as "segments"), such as one or more stacks or columns of solid oxide fuel cells having a ceramic oxide electrolyte separated by conductive interconnect plates. Other fuel cell types, such as PEM, molten carbonate, phosphoric acid, etc., may also be used.

Fuel cells are often combined into units called "stacks" in which the fuel cells are electrically connected in series and separated by electrically conductive interconnects, such as gas separator plates which function as interconnects. A fuel cell stack may contain conductive end plates on its ends. A generalization of a fuel cell stack is the so-called fuel cell segment or column, which can contain one or more fuel cell stacks connected in series (e.g., where the end plate of one stack is connected electrically to an end plate of the next stack). A fuel cell segment or column may contain electrical leads which output the direct current from the segment or column to a power conditioning system. A fuel cell stack segment is a segment containing one or more fuel cell stacks. A fuel cell system can include one or more fuel cell columns, each of which may contain one or more fuel cell stacks, such as solid oxide fuel cell stacks.

The fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

Power modules may also comprise other generators of direct current, such as solar cell, wind turbine, geothermal or hydroelectric power generators.

The segment(s) 106A of fuel cells may be connected to one or more the DC buses 112 such as a split DC bus, by one or more DC/DC converters 106B located in module 106. The DC/DC converters 106B may be located anywhere in the fuel cell system, for example in the IOM 104 instead of the power modules 106.

The system may also optionally include an energy storage module 108 including a storage device, such as a bank of supercapacitors, batteries, flywheel, etc. The storage device may also be connected to the DC bus 112 using one or more DC/DC converters as shown in FIG. 1. Alternatively, the storage devices may be located in the power module 106 and/or together with the IT load 102. The IT load 102 may include a power supply 102A having an A-side (i.e., a primary side) connected to the DC bus 112 and a B-side (i.e., a back-up side) connected to the electrical grid 114 (e.g., 480V AC grid). The IOM 104 may also be connected to the grid 114 to provide power to the grid 114.

Figure 2:
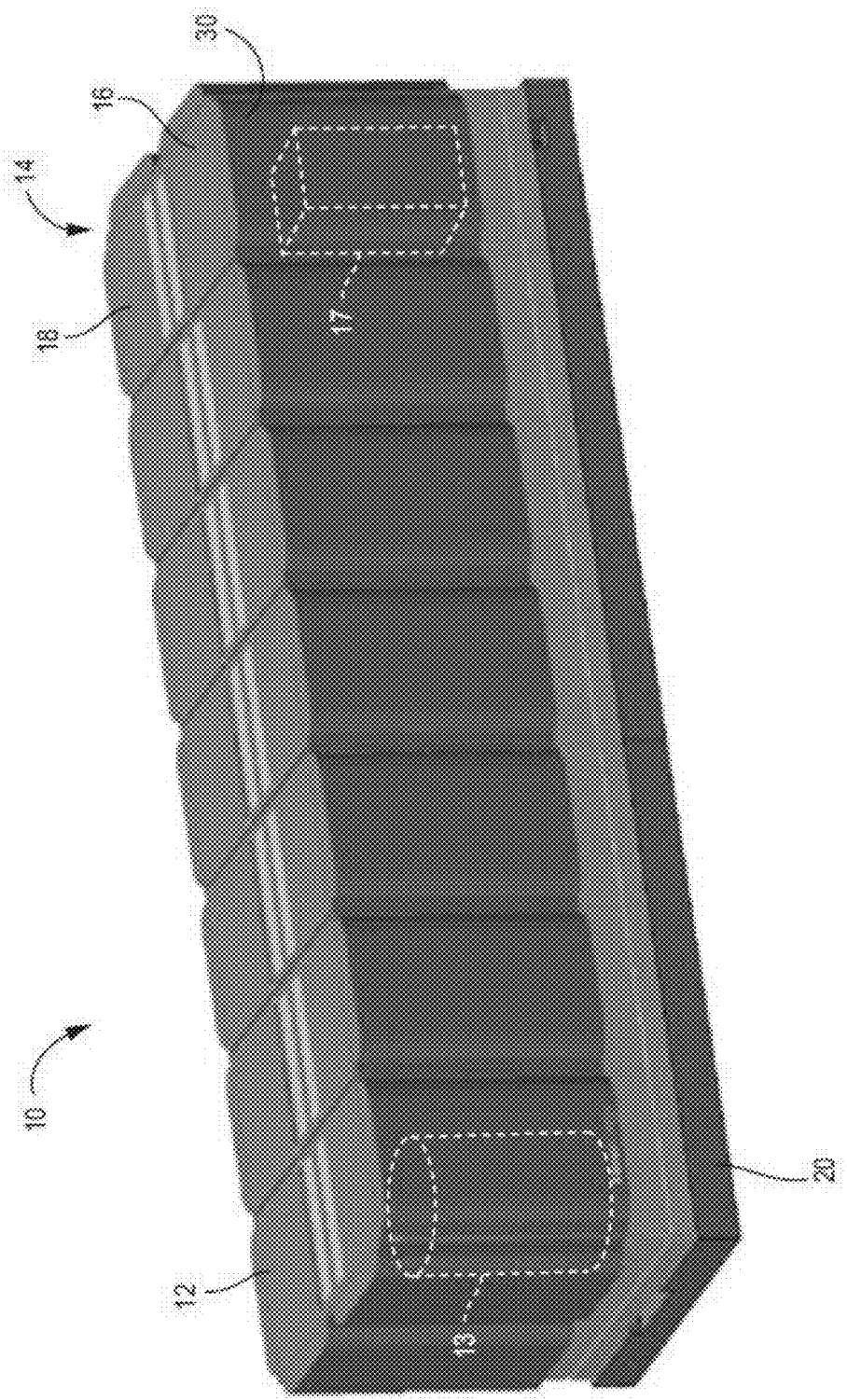
FIG. 2 is an isometric view of a modular fuel cell system enclosure that can be used with the exemplary embodiments.

FIG. 2 illustrates an exemplary modular fuel cell system described in U.S. Pat. No. 8,440,362, incorporated herein by reference in their entirety. The modular system may contain modules and components described above as well as in U.S. patent application Ser. No. 11/656,006, filed on Jan. 22, 2007, and entitled "Modular Fuel Cell System" which is incorporated herein by reference in its entirety. The modular design of the fuel cell system enclosure 10 provides flexible system installation and operation.

The modular fuel cell system enclosure 10 includes a plurality of power module housings 12 (containing a fuel cell power module components, where the housing 12 and its components are jointly labeled 106 in FIG. 1), one or more fuel input (i.e., fuel processing) module housings 16, and one or more power conditioning (i.e., electrical output) module housings 18 (where the housing and its contents are labeled 104 and referred to as "IOM" in FIG. 1). For example, the system enclosure may include any desired number of modules, such as 2-30 power modules, for example 6-12 power modules. FIG. 2 illustrates a system enclosure 10 containing six power modules (one row of six modules stacked side to side), one fuel processing module, and one power conditioning module, on a common base 20. Each module may comprise its own cabinet or housing. Alternatively, the power conditioning (i.e., IOM) and fuel processing modules may be combined into a single input/output module located in one cabinet or housing 14. For brevity, each housing 12, 14, 16, 18 will be referred to as "module" below.

While one row of power modules 12 is shown, the system may comprise more than one row of modules 12. For example, the system may comprise two rows of power modules stacked back to back.

Each power module 12 is configured to house one or more hot boxes 13. Each hot box contains one or more stacks or columns of fuel cells (not shown for clarity), such as one or more stacks or columns of solid oxide fuel cells having a ceramic oxide electrolyte separated by conductive interconnect plates. Other fuel cell types, such as PEM, molten carbonate, phosphoric acid, etc. may also be used.

The modular fuel cell system enclosure 10 also contains one or more input or fuel processing modules 16. This module 16 includes a cabinet which contains the components used for pre-processing of fuel, such as desulfurizer beds. The fuel processing modules 16 may be designed to process different types of fuel. For example, a diesel fuel processing module, a natural gas fuel processing module, and an ethanol fuel processing module may be provided in the same or in separate cabinets. A different bed composition tailored for a particular fuel may be provided in each module. The processing module(s) 16 may processes at least one of the following fuels selected from natural gas provided from a pipeline, compressed natural gas, methane, propane, liquid petroleum gas, gasoline, diesel, home heating oil, kerosene, JP-5, JP-8, aviation fuel, hydrogen, ammonia, ethanol, methanol, syn-gas, bio-gas, bio-diesel and other suitable hydrocarbon or hydrogen containing fuels. If desired, a reformer 17 may be located in the fuel processing module 16. Alternatively, if it is desirable to thermally integrate the reformer 17 with the fuel cell stack(s), then a separate reformer 17 may be located in each hot box 13 in a respective power module 12. Furthermore, if internally reforming fuel cells are used, then an external reformer 17 may be omitted entirely.

The modular fuel cell system enclosure 10 also contains one or more power conditioning modules 18. The power conditioning module 18 includes a cabinet which contains the components for converting the fuel cell stack generated DC power to AC power (e.g., DC/DC and DC/AC converters described in U.S. Pat. No. 7,705,490, incorporated herein by reference in its entirety), electrical connectors for AC power output to the grid, circuits for managing electrical transients, a system controller (e.g., a computer or dedicated control logic device or circuit). The power conditioning module 18 may be designed to convert DC power from the fuel cell modules to different AC voltages and frequencies. Designs for 208V, 60 Hz; 480V, 60 Hz; 415V, 50 Hz and other common voltages and frequencies may be provided.

The fuel processing module 16 and the power conditioning module 18 may be housed in one input/output cabinet 14. If a single input/output cabinet 14 is provided, then modules 16 and 18 may be located vertically (e.g., power conditioning module 18 components above the fuel processing module 16 desulfurizer canisters/beds) or side by side in the cabinet 14.

As shown in one exemplary embodiment in FIG. 2, one input/output cabinet 14 is provided for one row of six power modules 12, which are arranged linearly side to side on one side of the input/output module 14. The row of modules may be positioned, for example, adjacent to a building for which the system provides power (e.g., with the backs of the cabinets of the modules facing the building wall). While one row of power modules 12 is shown, the system may comprise more than one row of modules 12. For example, as noted above, the system may comprise two rows of power modules stacked back to back.

The linear array of power modules 12 is readily scaled. For example, more or fewer power modules 12 may be provided depending on the power needs of the building or other facility serviced by the fuel cell system 10. The power modules 12 and input/output modules 14 may also be provided in other ratios. For example, in other exemplary embodiments, more or fewer power modules 12 may be provided adjacent to the input/output module 14. Further, the support functions could be served by more than one input/output module 14 (e.g., with a separate fuel processing module 16 and power conditioning module 18 cabinets). Additionally, while in one embodiment, the input/output module 14 is at the end of the row of power modules 12, it could also be located in the center of a row of power modules 12.

The modular fuel cell system enclosure 10 may be configured in a way to ease servicing of the system. All of the routinely or high serviced components (such as the consumable components) may be placed in a single module to reduce amount of time required for the service person. For example, the purge gas and desulfurizer material for a natural gas fueled system may be placed in a single module (e.g., a fuel processing module 16 or a combined input/output module 14 cabinet). This would be the only module cabinet accessed during routine maintenance. Thus, each module 12, 14, 16, and 18 may be serviced, repaired or removed from the system without opening the other module cabinets and without servicing, repairing or removing the other modules.

For example, as described above, the enclosure 10 can include multiple power modules 12. When at least one power module 12 is taken off line (i.e., no power is generated by the stacks in the hot box 13 in the off line module 12), the remaining power modules 12, the fuel processing module 16 and the power conditioning module 18 (or the combined input/output module 14) are not taken off line. Furthermore, the fuel cell enclosure 10 may contain more than one of each type of module 12, 14, 16, or 18. When at least one module of a particular type is taken off line, the remaining modules of the same type are not taken off line.

Thus, in a system comprising a plurality of modules, each of the modules 12, 14, 16, or 18 may be electrically disconnected, removed from the fuel cell enclosure 10 and/or serviced or repaired without stopping an operation of the other modules in the system, allowing the fuel cell system to continue to generate electricity. The entire fuel cell system does not have to be shut down if one stack of fuel cells in one hot box 13 malfunctions or is taken off line for servicing.

Each of the power modules 12 and input/output modules 14 include a door 30 (e.g., hatch, access panel, etc.) to allow the internal components of the module to be accessed (e.g., for maintenance, repair, replacement, etc.). According to one embodiment, the modules 12 and 14 are arranged in a linear array that has doors 30 only on one face of each cabinet, allowing a continuous row of systems to be installed abutted against each other at the ends. In this way, the size and capacity of the fuel cell enclosure 10 can be adjusted with additional modules 12 or 14 and bases 20 with minimal rearranging needed for existing modules 12 and 14 and bases 20. If desired, the door to module 14 may be on the side rather than on the front of the cabinet.

The door 30 may open in tandem with a substantially vertical and then substantially horizontal swing (e.g., "gull-wing" style). In other words, the door 30 opens by being moved up and then at least partially over the top of the enclosure 10 in a substantially horizontal direction. The terms substantially vertical and substantially horizontal of this embodiment include a deviation of 0 to 30 degrees, such as 0 to 10 degrees from exact vertical and horizontal directions, respectively.

The door 30 is mounted on to walls of the enclosure or cabinet 10 of the module 12 or 14 with plural independent mechanical arms. In the open position the upper portion of the door 30 may be located over the enclosure or cabinet 10 and the lower portion of the door may optionally overhang the opening to the enclosure 10. In this configuration, the door 30 provides rain and snow protection for a user when open since the lower portion of the door overhangs from the fuel cell system enclosure 10. Alternatively, the entire door 30 may be located over the enclosure 10 in the open position.

Figure 3:
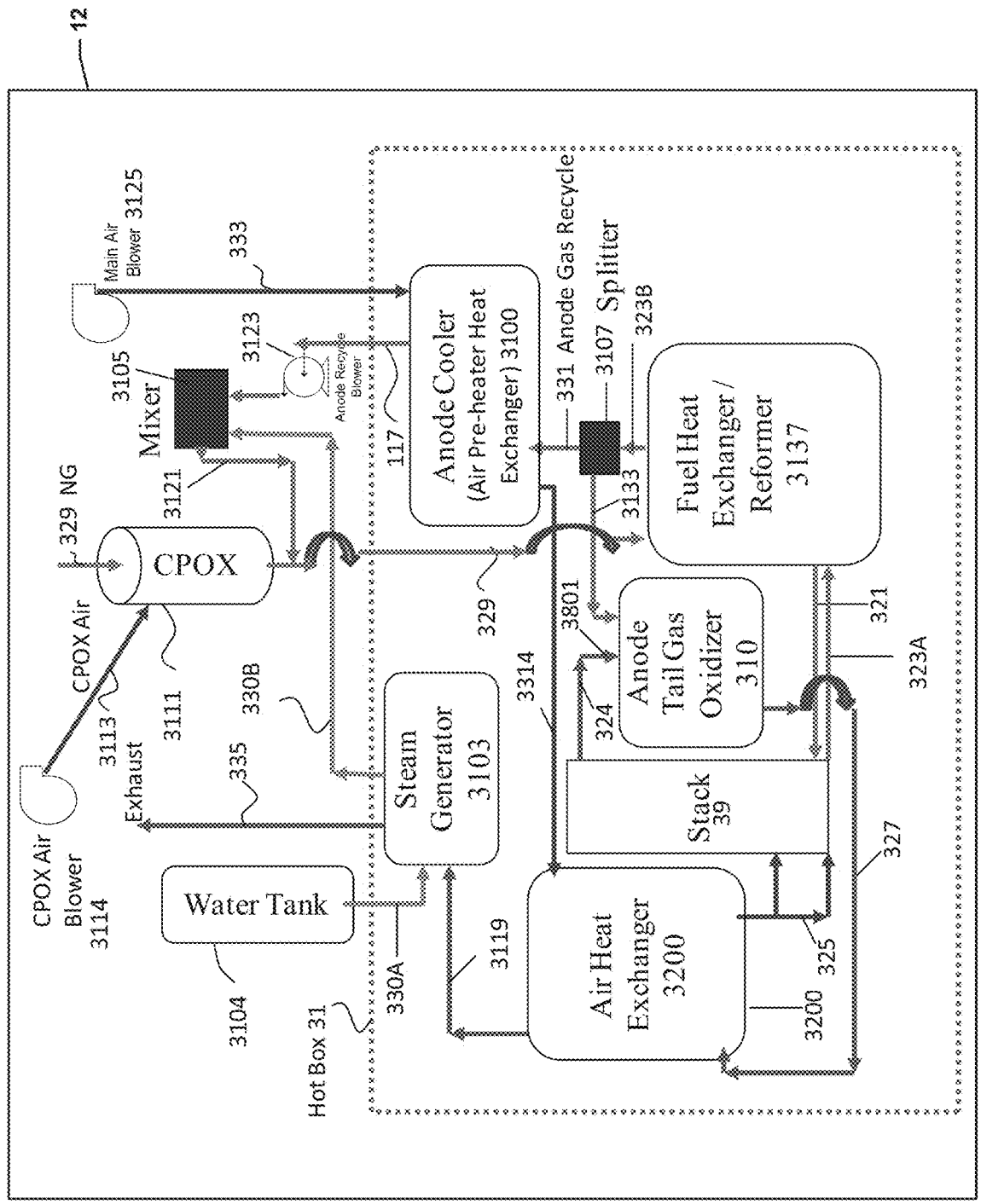
FIG. 3 is a schematic process flow diagram illustrating a hot box that can be used with the exemplary embodiments.

FIG. 3 is a schematic process flow diagram representation of module 12 and the hot box 31 (labeled 13 in FIG. 2) components showing the various flows through the components, as described in U.S. Pat. No. 8,563,180 issued on Oct. 22, 2013 and incorporated herein by reference in its entirety.

The hot box 31 contains the plurality of the fuel cell stacks 39, such as a solid oxide fuel cell stacks (where one solid oxide fuel cell of the stack contains a ceramic electrolyte, such as yttria stabilized zirconia (YSZ) or scandia stabilized zirconia (SSZ), an anode electrode, such as a nickel-YSZ or Ni-SSZ cermet, and a cathode electrode, such as lanthanum strontium manganite (LSM)). The stacks 39 may be arranged over each other in a plurality of columns or segments.

The hot box 31 also contains a steam generator 3103. The steam generator 3103 is provided with water through conduit 330A from a water source 3104, such as a water tank or a water pipe (i.e., a continuous water supply), and converts the water to steam. The steam is provided from generator 3103 to mixer 3105 through conduit 330B and is mixed with the stack anode (fuel) recycle stream in the mixer 3105. The mixer 3105 may be located inside or outside the hot box of the hot box 31. Preferably, the humidified anode exhaust stream is combined with the fuel inlet stream in the fuel inlet line or conduit 329 downstream of the mixer 3105, as schematically shown in FIG. 3. Alternatively, if desired, the fuel inlet stream may also be provided directly into the mixer 3105, or the steam may be provided directly into the fuel inlet stream and/or the anode exhaust stream may be provided directly into the fuel inlet stream followed by humidification of the combined fuel streams. The steam generator 3103 is heated by the hot anode tailgas oxidizer ("ATO") 310 exhaust stream which is passed in heat exchange relationship in conduit 3119 with the steam generator 3103.

The system operates as follows. The fuel inlet stream, such as a hydrocarbon stream, for example natural gas, is provided into the fuel inlet conduit 329 and through a catalytic partial pressure oxidation (CPOx) reactor 3111 located outside the hot box. During system start up, air is also provided into the CPOx reactor 3111 through CPOx air inlet conduit 3113 to catalytically partially oxidize the fuel inlet stream. The air may be blown through the air inlet conduit 3113 to the CPOx reactor 3111 by a CPOx air blower 3114. The CPOx air blower 3114 may only operate during startup. During steady state system operation, the air flow is turned off (e.g., by powering off the CPOx air blower 3114) and the CPOx reactor acts as a fuel passage way in which the fuel is not partially oxidized. Thus, the hot box 31 may comprise only one fuel inlet conduit which provides fuel in both start-up and steady state modes through the CPOx reactor 3111. Therefore a separate fuel inlet conduit which bypasses the CPOx reactor during steady state operation is not required.

The fuel inlet stream is provided into the fuel heat exchanger (anode recuperator)/pre-reformer 3137 where its temperature is raised by heat exchange with the stack 39 anode (fuel) exhaust streams. The fuel inlet stream is pre-reformed in the pre-reformer section of the heat exchanger 3137 via the SMR reaction and the reformed fuel inlet stream (which includes hydrogen, carbon monoxide, water vapor and unreformed methane) is provided into the stacks 39 through the fuel inlet conduit(s) 321. The fuel inlet stream travels upwards through the stacks through fuel inlet risers in the stacks 39 and is oxidized in the stacks 39 during electricity generation. The oxidized fuel (i.e., the anode or fuel exhaust stream) travels down the stacks 39 through the fuel exhaust risers and is then exhausted from the stacks through the fuel exhaust conduits 323A into the fuel heat exchanger 3137.

In the fuel heat exchanger 3137, the anode exhaust stream heats the fuel inlet stream via heat exchange. The anode exhaust stream is then provided via the fuel exhaust conduit 323B into a splitter 3107. A first portion of the anode exhaust stream is provided from the splitter 3107 the ATO 310 via conduit (e.g., slits) 3133.

A second portion of the anode exhaust stream is recycled from the splitter 3107 into the anode cooler 3100 and then into the fuel inlet stream. For example, the second portion of the anode exhaust stream is recycled through conduit 331 into the anode cooler (i.e., air pre-heater heat exchanger) where the anode exhaust stream pre-heats the air inlet stream from conduit 333. The anode exhaust stream is then provided by the anode recycle blower 3123 into the mixer 3105. The anode exhaust stream is humidified in the mixer 3105 by mixing with the steam provided from the steam generator 3103. The humidified anode exhaust stream is then provided from the mixer 3105 via humidified anode exhaust stream conduit 3121 into the fuel inlet conduit 329 where it mixes with the fuel inlet stream.

The air inlet stream is provided by a main air blower 3125 from the air inlet conduit 333 into the anode cooler heat exchanger 3100. The blower 3125 may comprise the single air flow controller for the entire system, as described above. In the anode cooler heat exchanger 3100, the air inlet stream is heated by the anode exhaust stream via heat exchange. The heated air inlet stream is then provided into the air heat exchanger (cathode recuperator 3200) via conduit 3314. The heated air inlet stream is provided from heat exchanger 3200 into the stack(s) 39 via the air inlet conduit and/or manifold 325.

The air passes through the stacks 39 into the cathode exhaust conduit 324 and through conduit 324 and mixer 3801 into the ATO 310. In the ATO 310, the air exhaust stream oxidizes the split first portion of the anode exhaust stream from conduit 3133 to generate an ATO exhaust stream. The ATO exhaust stream is exhausted through the ATO exhaust conduit 327 into the air heat exchanger 3200. The ATO exhaust stream heats air inlet stream in the air heat exchanger 3200 via heat exchange. The ATO exhaust stream (which is still above room temperature) is then provided from the air heat exchanger 3200 to the steam generator 3103 via conduit 3119. The heat from the ATO exhaust stream is used to convert the water into steam via heat exchange in the steam generator 3103. The ATO exhaust stream is then removed from the system via the exhaust conduit 335. Thus, by controlling the air inlet blower output (i.e., power or speed), the magnitude (i.e., volume, pressure, speed, etc.) of air introduced into the system may be controlled. The cathode (air) and anode (fuel) exhaust streams are used as the respective ATO air and fuel inlet streams, thus eliminating the need for a separate ATO air and fuel inlet controllers/blowers. Furthermore, since the ATO exhaust stream is used to heat the air inlet stream, the control of the rate of single air inlet stream in conduit 333 by blower 3125 can be used to control the temperature of the stacks 39 and the ATO 310.

Thus, as described above, by varying the main air flow in conduit 333 using a variable speed blower 3125 and/or a control valve is used to maintain the stack 39 temperature and/or ATO 310 temperature. In this case, the main air flow rate control via blower 3125 or valve acts as a main system temperature controller. Furthermore, the ATO 310 temperature may be controlled by varying the fuel utilization (e.g., ratio of current generated by the stack(s) 39 to fuel inlet flow provided to the stack(s) 39). Finally the anode recycle flow in conduits 331 and 3117 may be controlled by a variable speed anode recycle blower 3123 and/or a control valve to control the split between the anode exhaust to the ATO 310 and anode exhaust for anode recycle into the mixer 3105 and the fuel inlet conduit 329.

In the configuration illustrated in FIG. 3, there may be no fuel and air inputs to the ATO 310. External natural gas or another external fuel may not be fed to the ATO 310. Instead, the hot fuel (anode) exhaust stream from the fuel cell stack(s) 39 is partially recycled into the ATO as the ATO fuel inlet stream. Likewise, there is no outside air input into the ATO. Instead, the hot air (cathode) exhaust stream from the fuel cell stack(s) 39 is provided into the ATO as the ATO air inlet stream.

Furthermore, the fuel exhaust stream is split in a splitter 3107 located in the hot box 1. The splitter 3107 is located between the fuel exhaust outlet of the anode recuperator (e.g., fuel heat exchanger) 3137 and the fuel exhaust inlet of the anode cooler 3100 (e.g., the air pre-heater heat exchanger). Thus, the fuel exhaust stream is split between the mixer 3105 and the ATO 310 prior to entering the anode cooler 3100. This allows higher temperature fuel exhaust stream to be provided into the ATO than in the prior art because the fuel exhaust stream has not yet exchanged heat with the air inlet stream in the anode cooler 3100. For example, the fuel exhaust stream provided into the ATO 310 from the splitter 3107 may have a temperature of above 350 C, such as 350-500 C, for example 375 to 425 C, such as 390-410 C. Furthermore, since a smaller amount of fuel exhaust is provided into the anode cooler 3100 (e.g., not 100% of the anode exhaust is provided into the anode cooler due to the splitting of the anode exhaust in splitter 3107), the heat exchange area of the anode cooler 3100 may be reduced.

The systems, methods, and devices of the various embodiments provide a hardware and software architecture enabling electrochemical impedance spectroscopy ("EIS") to be performed on multiple electrochemical devices, such as fuel cells, at the same time without human interaction with the electrochemical devices. In an embodiment, a matrix switch may connect each subset of cells (e.g., an individual cell or a group of plural cells) of a fuel cell stack individually to an EIS analyzer enabling EIS to be performed on any fuel cell in the fuel cell stack. Preferably, the subset of cells is a single fuel cell. However, the subset of cells may contain two or more cells, such part of all of the cells in a given stack or all of the cells in a given stack. In a further embodiment, the EIS analyzer may be a multi-channel EIS analyzer, and the combination of the matrix switch and multi-channel EIS analyzer may enable EIS to be performed on multiple fuel cells (i.e., multiple subsets of cells) simultaneously. Performance of EIS on multiple fuel cells simultaneously may reduce EIS execution time and enable individual cells to be tested and compared at the same time under the same system conditions.

EIS enables the overall impedance of an electrochemical device to be determined by measuring a voltage or current across the electrochemical device at varying sampling frequencies. A testing waveform selected to achieve the varying sampling frequencies, such as a waveform with oscillations of approximately 1 Hz, may be generated on a line connected to the electrochemical device, thereby injecting the test waveform into the electrochemical device. The testing waveform may be a sine wave or other type wave selected to achieve desired sampling frequencies. A voltage or current and resulting phase angle of the electrochemical device may be determined at each of the sampling frequencies, and using EIS converted into impedances. EIS may enable the study of the polarization behavior and conductivity properties of electrodes, electrolytes and/or current carriers in electrochemical power sources, such as fuel cells.

EIS may enable electrochemical device operators to understand degradation pattern of, health of (e.g., whether repair is needed), and/or electrochemical composition (e.g., gas flow to the fuel cells or electrode composition) of deployed electrochemical devices. Results of the EIS procedure (e.g., the impedance at varying frequencies) may be graphically represented using a Nyquist plot or Bode plot and characteristics of the electrochemical device may be determined based on the impedance response of the electrochemical device. By comparing the impedance response of the electrochemical device being measured to known signatures of impedance responses of electrochemical devices with known characteristics, the characteristics of the measured device may be identified. Characteristics of the electrochemical device that may be determined based at least in part on the impedance response include fuel conditions (e.g., fuel utilization rate), air conditions (e.g., an air utilization rate), catalyst conditions (e.g., cracks in anode electrode catalyst and/or carbon or sulfur poisoning of the anode electrode catalyst), and water conditions (e.g., PEM fuel cell membrane water flooding). Based on the characteristics of the electrochemical device a setting of the electrochemical device may be adjusted. For example, based on the fuel utilization rate and/or water flow rate, a fuel flow and/or water flow into the fuel inlet stream setting for fuel provided to the electrochemical device may be adjusted. Additionally, determined characteristics of the electrochemical device may be compared to a failure threshold, and when the characteristics exceed the failure threshold, a failure mode of the electrochemical device may be indicated, such as a fuel starvation state, a catalyst poisoning state, or a water flooding state. The module 12 containing the device which exceeded the failure threshold may be turned off (i.e., taken off line) and serviced or replaced.

In a specific embodiment, the electrochemical devices may be one or more fuel cell stack segments comprised of one or more fuel cells connected in series, such as one fuel cell, two fuel cells, twenty-five fuel cells, etc. the fuel cell stack segments may be segments of solid oxide fuel cells, proton exchange membrane fuel cells, phosphoric acid fuel cells, molten carbonate fuel cells, or other type fuel cells. For example, the fuel cell stack segments may be fuel cell stack segments of fuel cells 106A.

Figure 4:
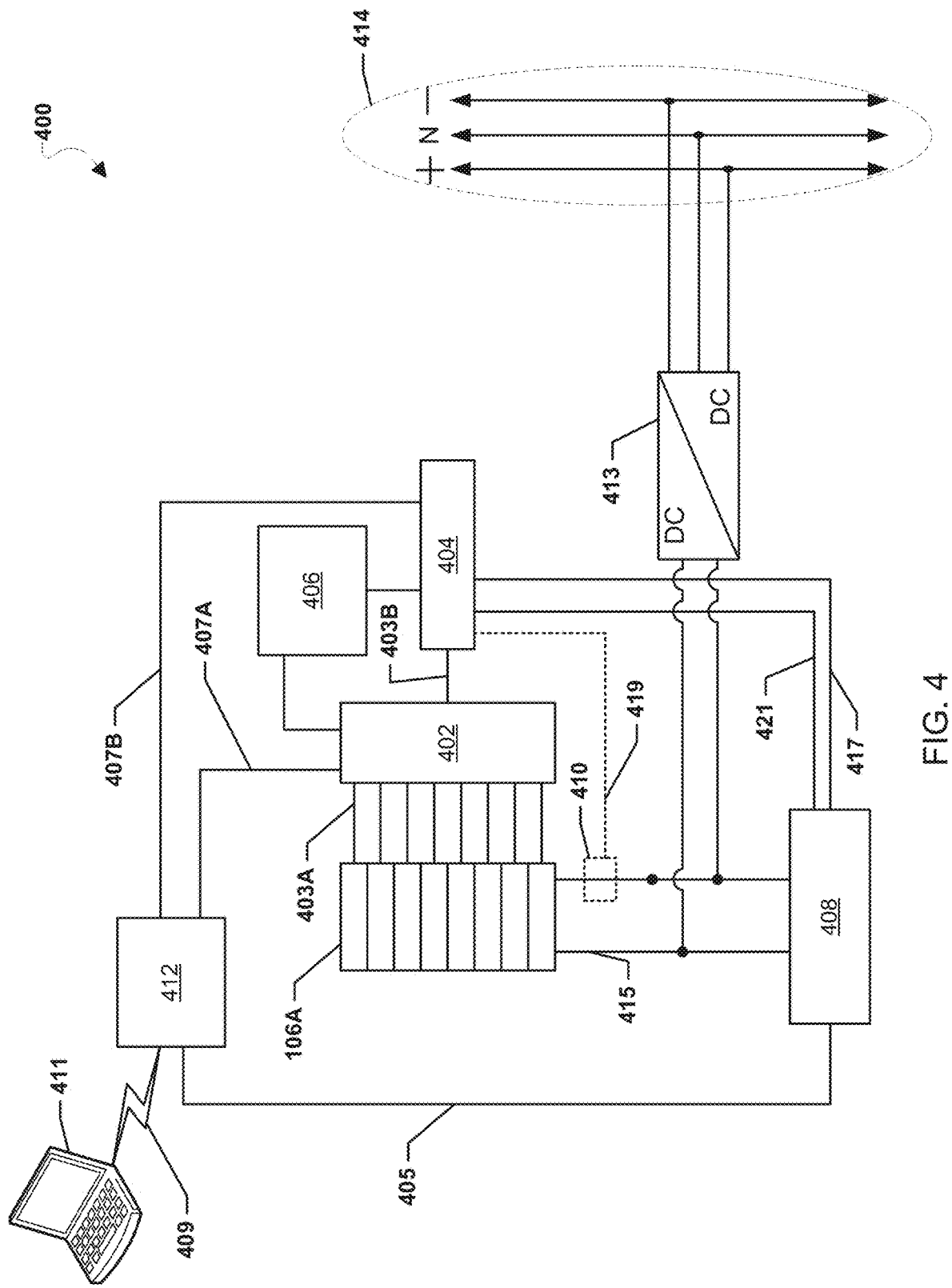
FIG. 4 is a block diagram of a system according to an embodiment.

FIG. 4 is a block diagram of a system 400 according to an embodiment. The system 400 may include an EIS analyzer 404, a matrix switch 402, an electrochemical device, such as fuel cell stack 106A, and a load bank 408. The fuel cell stack 106A may be part of a larger segment of stacks which are electrically connected to a DC bus 414 (numbered 112 in FIG. 1) via one or more power electronics 413, such as a DC to DC converter (numbered 106B in FIG. 1). In operation, the fuel cell stack 106A may output DC voltages to the power electronics 413 which may output DC voltages to the DC bus 414. In an embodiment, the DC bus 414 may be a three-phase bus comprised of a positive line, a neutral line, and a negative line.

FIG. 4 illustrates a number of electrical connections, such as data transfer connections, between the components. These connections may be wired (e.g., wire, cable, bus, etc.) or wireless. The matrix switch 402 may be electrically connected by electrical connection(s) 403A to each individual fuel cell of the fuel cell stack 106A. While the fuel cell stack 106A is illustrated as having eight cells, these eight cells are illustrated merely for example and the fuel cell stack 106A may have more than eight cells or less than eight cells, such as 10-100 cells, for example 25-50 cells. The EIS analyzer 404 may be electrically connected by electrical connections 421 to an electrical connection to the fuel cell stack 106A (for example, by one or more connections to the fuel cell stack 106A via the load bank 408) such that the EIS analyzer 404 may inject a test waveform into the fuel cell stack 106A via the electrical connection 421 (for example, by injecting a test waveform into the fuel cell stack 106A via the load bank 408). The EIS analyzer 404 may also be connected by electrical connection(s) 403B to the matrix switch 402 such that the EIS analyzer 404 may sample waveforms from the individual fuel cells of the fuel cell stack 106A via the matrix switch 402 resulting from an injected test waveform into the fuel cell stack 106A on electrical connection 421 (for example, an injected test waveform from electrical connection 421 into the fuel cell stack 106A via the load bank 408). As an example, the EIS analyzer 404 may inject test waveforms that adjust the frequency as a function of time. While illustrated as a single EIS analyzer 404, the EIS analyzer 404 may be comprised of multiple EIS analyzers connected together in master and slave configurations to monitor any number of independent channels of waveform responses from individual fuel cells of the fuel cell stack 106A and the matrix switch 402 may be sized to support the selected number of independent channels.

The fuel cell stack 106A may be electrically connected to the load bank 408 by electrical connection 415 such that the load bank 408 may monitor the current and/or voltage output of the fuel cell stack 106A. A load bank is a device which develops an electrical load, applies the load to an electrical power source and converts or dissipates the resultant power output of the source. The purpose of a load bank is to accurately mimic the operational or "real" load that a power source will see in actual application. However, unlike the "real" load, which is likely to be dispersed, unpredictable and random in value, a load bank provides a contained, organized and fully controllable load. The matrix switch 402 and the EIS analyzer 404 may each be connected to a power supply 406 which may supply power to the matrix switch 402 and the EIS analyzer 404. As an example, the power supply may be a 240 volt AC power supply. The load bank 408 may be electrically connected to the EIS analyzer 404. Optionally, a current transducer, such as a hall effect current transducer, may be connected between the load bank 408 and fuel cell stack 106A to sense the current and output an analog signal representative of the current to the EIS analyzer 404. The current transducer may be optional, and may be needed when the load bank is unable to respond to the high frequency region of the current output of the fuel cell stack 106A.

The matrix switch 402, the EIS analyzer 404, and the load bank 408 may be connected to a controller 412. For example, the load bank 408 may be connected to the controller 412 by a General Purpose Interface Bus ("GPIB") connection 405, and the EIS analyzer 404 and matrix switch 402 may be connected to the controller 412 by respective Universal Serial Bus ("USB") connections 407A, 407B. In an embodiment, the controller 412 may be a processor configured with processor-executable instructions to perform operations to control the matrix switch 402, EIS analyzer 404, load bank 408, and auxiliary systems (such as fuel blower 3123 and air blowers 3114, 3125) providing fuel and/or air to the fuel cell stack 106A. In an embodiment, the controller 412 may have established wired and/or wireless connections 409 with a personal computer 411, such as a laptop computer used for fuel cell system maintenance and monitoring. The personal computer 411 may be configured to enable fuel cell operations and maintenance personnel to select and analyze particular regions of the response curves of selected cells of the fuel cell stack 106A to monitor the impedance response of the selected cells.

In operation, controller 412 may select one or more fuel cells of the fuel cell stack 106A on which to perform EIS monitoring at one time. For example, the controller may select, one, two, three, four, five, or more subsets of fuel cells on which to conduct EIS monitoring at the same time. The controller 412 may control the matrix switch 402 to align one input of the EIS analyzer 404 with each of the selected one more fuel cells and may control the EIS analyzer 404 to inject a test waveform via connection 421 into the fuel cell stack 106A (for example, via connection 421 through the load bank 408 and into the fuel cell stack 106A). The controller 412 may control the EIS analyzer 404 to receive the output from each respective selected fuel cell of the fuel cell stack 106A via the matrix switch 402. In an embodiment, the test waveform may be a full frequency sweep waveform. In another embodiment, the test waveform may be super positioned frequencies or standard ranges of frequencies to enable only particular regions of frequencies to be tested, such as 10 KHz, 8 KHz, 6 KHz, 4 KHz, 3 KHz, 2 KHz, 1 KHz, etc. The load bank 408 may receive an output signal from the EIS analyzer 404 via connection 417 and in response measure the resulting current and/or voltage output of the selected fuel cells of the fuel cell stack 106A and output the measurement results to the controller 412. In an embodiment, the EIS analyzer 404 may also monitor the results via the optional current transducer 410 on electrical connection 415 and output the results to the controller 412 via connection 419. By injecting different test waveforms into the fuel cell stack 106A, different responses of the fuel cells of the fuel cell stack 106A may be monitored. By monitoring the response of different fuel cells of the fuel cell stack 106A independently via matrix switch 402, EIS monitoring of more than one cell may be conducted at the same time. Once EIS monitoring of an initial set of selected fuel cells of the fuel cell stack 106A is complete, the controller 412 may select a next set of one or more fuel cells of the fuel cell stack and control the matrix switch 402 to align one input of the EIS analyzer 404 with an output of each of the next set of selected one or more fuel cells. In this manner, EIS monitoring may be conducted on successive sets of fuel cells of the fuel cell stack. In this manner, by testing multiple fuel cells of the fuel cell stack successively together, EIS monitoring of every individual cell of the fuel cell stack 106A may be completed faster than if each individual fuel cell of the fuel cell stack 106A had to be tested individually in sequence.

The controller 412 may use the impedance response determined by EIS monitoring of the selected fuel cells of the fuel cell stack 106A received from the load bank 408 and/or the EIS analyzer 404 to determine a characteristic of each selected fuel cell and may adjust a setting of the system 400 based on the determined characteristic. The controller 412 may compare the impedance response determined by EIS monitoring of a selected fuel cell of the fuel cell stack 106A, such as a plot of the impedance response and/or stored impedance values, to impedance responses stored in a memory, such as stored plots of impedance responses and/or stored impedance values, of similar fuel cells correlated with known characteristics. The controller 412 may compare the impedance response determined by EIS monitoring of a selected fuel cell of the fuel cell stack 106A to the stored impedance responses in any manner to identify matches between the impedance responses determined by EIS monitoring of a selected fuel cell of the fuel cell stack 106A and the stored impedance responses.

When the controller 412 determines a match (e.g., identically or within some predetermined variance value) between the impedance response determined by EIS monitoring of a selected fuel cell of the fuel cell stack 106A and a stored impedance response, the controller 412 may determine the characteristic correlated with the stored impedance response to be the characteristic of the respective selected fuel cell of the fuel cell stack 106A. For example, the controller 412 may determine a fuel utilization rate and/or steam to carbon ratio in the fuel inlet stream of the a fuel cell based on EIS monitoring and may adjust a fuel flow setting and/or water input into the fuel inlet steam setting of the system 400 based on the determined fuel utilization rate by adjusting blower 3123 or fuel input line 329 or water flow from line 3104 into steam generator 3103. As another example, the controller 412 may determine an air utilization rate of the selected fuel cell of the fuel cell stack 106A based on EIS monitoring and may adjust an air flow setting of the system 400 based on the determined air utilization rate by adjusting the air blower 3125 illustrated in FIG. 3. As other examples, EIS monitoring may enable a determined characteristics of a selected fuel cell of the fuel cell stack 106A to be compared to a failure threshold, and when the characteristics exceed the failure threshold a failure mode of the selected fuel cell of the fuel cell stack 106A may be indicated, such as a fuel starvation state (e.g., insufficient fuel at the anode), anode catalyst damage or poisoning state (e.g., by carbon and/or sulfur build up on the anode, anode catalyst cracking, etc.), or a water flooding state (e.g., in a PEM fuel cell) which may result in the fuel and/or water flow into the system being adjusted or may result in the shut off of the system.

Figure 5:
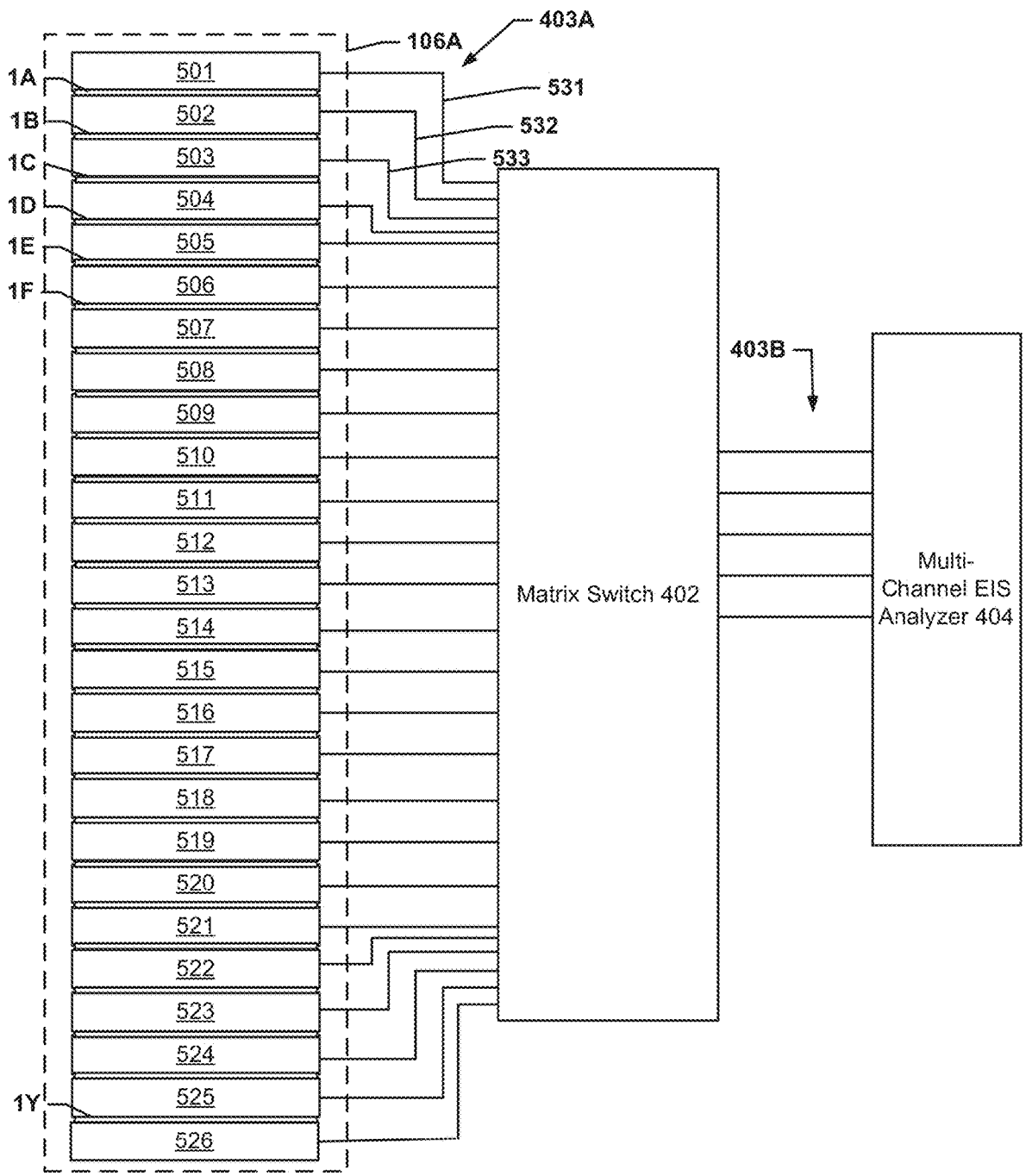
FIG. 5 is a block diagram illustrating connections between a multi-channel EIS analyzer, a matrix switch, and individual fuel cells of a fuel cell stack according to an embodiment.

FIG. 5 is a block diagram illustrating connections between a multi-channel EIS analyzer 404, a matrix switch 402, and individual fuel cells of a fuel cell stack, such as fuel cell stack 106A, according to an embodiment. The fuel cell stack 106A contains a plurality of fuel cells, such as twenty five cells 1A, 1B, 1C, 1D, 1E, 1F, . . . 1Y and a plurality of interconnects 501, 502, 503, 504, 505, 506, 507, 508, 509, 510, 511, 512, 513, 514, 515, 516, 517, 518, 519, 520, 521, 522, 523, 524, 525 and 526. The end interconnects 501 and 526 are end plates of the stack 106A. Each respective fuel cell in the stack is located between two adjacent interconnects. Thus, cell 1A is located between end plate 501 and interconnect 502, cell 1B is located between interconnects 502 and 503, cell 1C is located between interconnects 503 and 50, etc. The last cell 1Y is located between interconnect 525 and end plate 526.

The matrix switch 402 is connected to the stack 106A by electrical connections 403A, such as connections 531, 532, 533, etc. Each connection may comprise a wire, cable or bus which connects one interconnect in the stack with the switch 402. For example, connections 531, 532 and 533 are connected to respective interconnects 501, 502 and 503. Each fuel cell is electrically connected to the matrix switch 402 by two connections to adjacent interconnects in the stack. Thus, fuel cell 1A is electrically connected to matrix switch 402 by connections 531 and 532 to adjacent interconnects 501 and 502. This forms a closed electrical loop through the fuel cell 1A between interconnects 501 and 502. Likewise, fuel cell 1B is electrically connected to matrix switch 402 by connections 532 and 533 to adjacent interconnects 502 and 503. In this configuration, each fuel cell is independently electrically connected to the matrix switch 402, and each subset of fuel cells includes one cell. In another embodiment, the connection 532 to interconnect 502 may be omitted or be rendered inactive (i.e., no current or voltage applied to it or collected from it). In this embodiment, a subset of fuel cells includes two fuel cells 1A and 1B which are located between interconnects 501 and 503 to which an electrical signal is monitored via connections 531 and 533, respectively. In other embodiments, the subset of fuel cells may include more than two cells, such as three to twenty five cells.

In an embodiment, the multi-channel EIS analyzer 404 may be a five channel EIS analyzer enabling five instances of EIS monitoring to be performed in conjunction with each other. The multi-channel EIS analyzer 404 may be connected via five physical connections to the matrix switch 402. The matrix switch may comprise an array of internal switches configured to enable the any of the five physical connections of the EIS analyzer 404 to be aligned with any one of the twenty five individual fuel cells 1A to 1Y. In an embodiment, each of the test outputs of five interconnects 501, 502, 503, 504, and 505 may output waveforms in response to a test waveform from the multi-channel EIS analyzer 404 injected into the fuel cell stack 106A, such as a test waveform injected via connection 421 discussed above. The matrix switch 402 may be controlled to couple the outputs of five interconnects 501, 502, 503, 504, and 505 to a respective input of the multi-channel EIS analyzer 404 to direct the five independent waveforms from the five interconnects 501, 502, 503, 504, and 505 to five different inputs of the EIS analyzer 404. The matrix switch 402 may then be controlled to uncouple the test outputs of the five interconnects 501, 502, 503, 504, and 505 from the respective inputs of the multi-channel EIS analyzer 404 and couple the test outputs of five different interconnects 506, 507, 508, 509, and 510 to the inputs of the multi-channel EIS analyzer 404 to direct five additional waveforms from the five different interconnects 506, 507, 508, 509, and 510 to the five inputs of the multi-channel EIS analyzer 404. In a similar manner, the matrix switch 402 may be controlled to send the waveforms of the remaining interconnects 511-525 generated in response to an injected test waveform to the EIS analyzer 404 in successive groups as well. The analyzer 404 may contain more than or less than five channels, such as 2-4 channels or 6-25 channels, such as 8-10 channels, such as in master and slave configuration.

Figure 6:
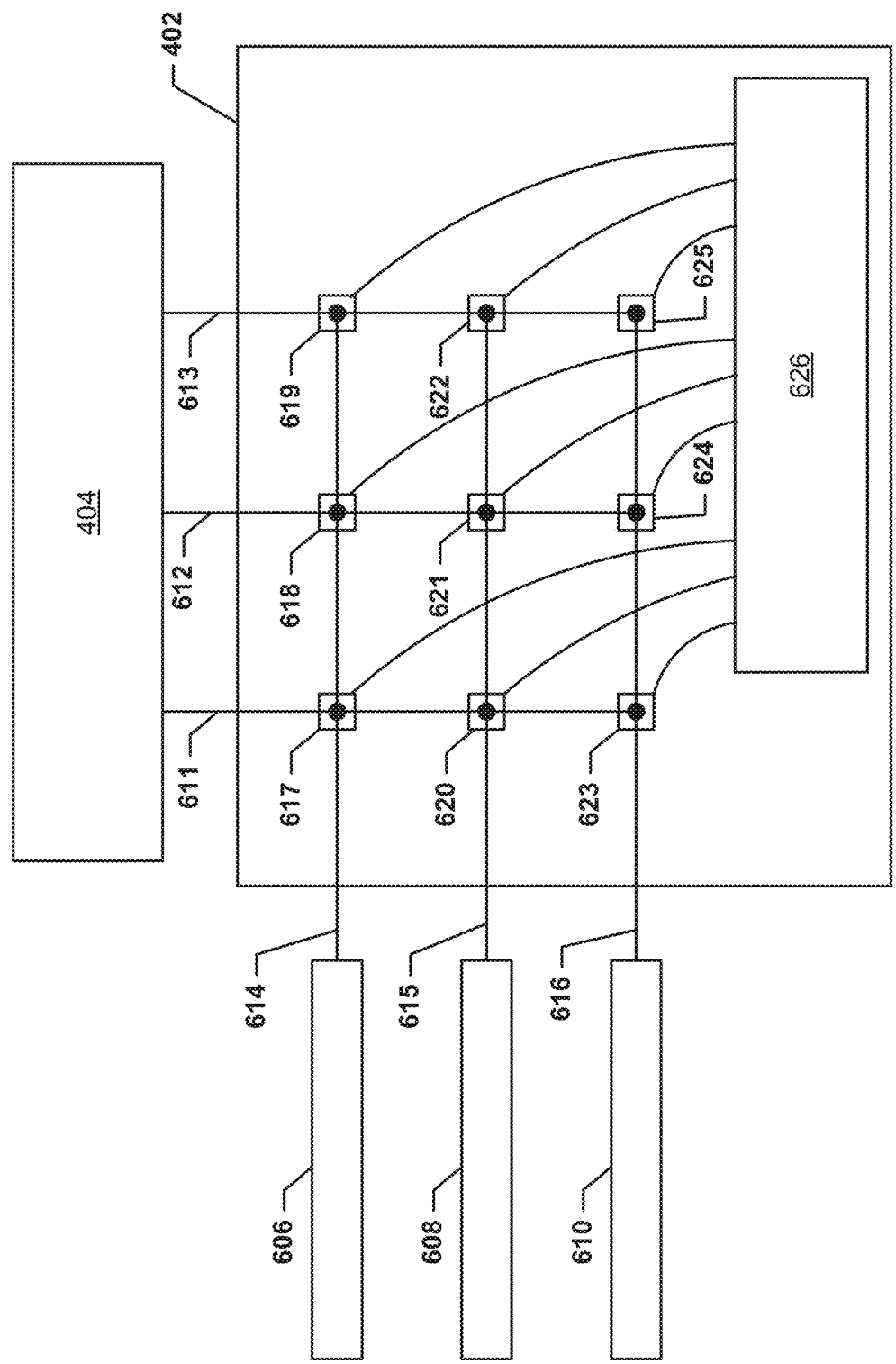
FIG. 6 is a block diagram illustrating example connections within a matrix switch connecting a multi-channel EIS to multiple individual fuel cells.

FIG. 6 is a block diagram illustrating example connections within a matrix switch 402 connecting a multi-channel EIS analyzer 404 to multiple subsets of fuel cells. FIG. 6 illustrates fuel cell stack elements 606, 608, and 610. Each element 606, 608 and 610 may be a subset of fuel cells, such as a single fuel cell, or an interconnect. If each element is a fuel cell, then it should be understood that the electrical connection is made to the fuel cell via two electrical connections to two interconnects located adjacent to opposite sides of the fuel cell, as shown in FIG. 5. If each element is an interconnect, then it electrically connects to two adjacent fuel cells on opposite sides of the interconnect.

For example, the multi-channel EIS analyzer 404 may be a three channel EIS analyzer with three physical inputs 611, 612, and 613 from the matrix switch 402. Each of the elements 606, 608, and 610 may be connected by a test output 614, 615, and 616, respectively, to the matrix switch 402. Outputs 614, 615 and 616 are single electrical connections (e.g., wires) if elements 606, 608 and 610 are interconnects, and outputs 614, 615 and 616 are dual single electrical connections (e.g., two wires) connected to two different interconnects in a stack if elements 606, 608 and 610 are fuel cells located between the respective interconnects.

Internal switches 617, 618, and 619 may connect the test output 614 to the three physical inputs 611, 612, and 613. Internal switches 620, 621, and 622 may connect the test output 615 to the three physical inputs 611, 612, and 613. Internal switches 623, 624, and 626 may connect the test output 616 to the three physical inputs 611, 612, and 613. A controller 626 of the matrix switch 626 may be connected to each switch 617-625 to control each switch 617-625. In this manner, by opening and/or closing the switches 617-625 the controller 626 may route waveforms from the fuel cells 606, 608, and 610 to the physical inputs 611, 612, and 613. While illustrated as a three channel multi-channel EIS analyzer 404 connected to a three input and three output matrix switch 402 and three fuel cells 606, 608, and 610, a three channel multi-channel EIS analyzer 404 connected to a three input and three output matrix switch 402 and three fuel cells 606, 608, and 610 is shown merely to illustrate principles of operation of a multi-channel EIS analyzer connected to a matrix switch and individual fuel cells. More or less channels of an EIS analyzer may be connected to more or less individual fuel cells via a matrix switch with a larger or smaller array of internal switches as appropriate to connect each individual fuel cell to each EIS analyzer input.

Figure 7:
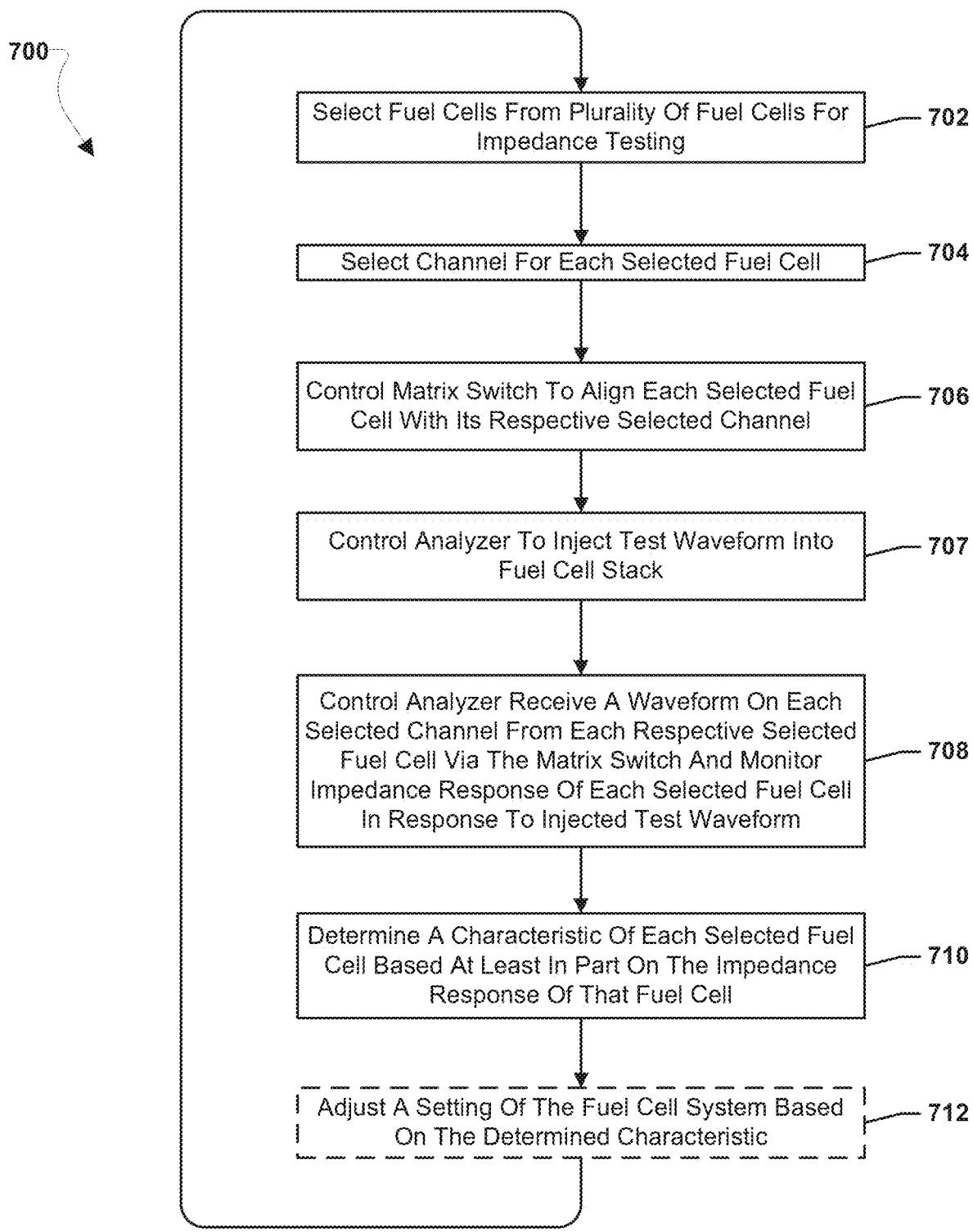
FIG. 7 is a process flow diagram illustrating an embodiment method for selecting and testing fuel cells.

FIG. 7 is a process flow diagram illustrating an embodiment method 700 for selecting and testing a plurality of fuel cells from a fuel cell stack at the same time. In an embodiment, the operations of method 700 may be performed by a controller of a fuel cell system, such as controller 412 of fuel cell system 400 discussed above with reference to FIG. 4. In block 702 the controller may select fuel cells from a plurality of fuel cells for impedance testing. The controller may select any fuel cells from a plurality of fuel cells. As an example, the controller may select the next group of fuel cells from a fuel cell stack (e.g., the next five fuel cells) for impedance testing. In block 704 the controller may select a channel for each selected fuel cell. For example, the controller may select a channel of a multi-channel EIS analyzer, such as multi-channel EIS analyzer 404, on which waveform will be received from each selected fuel cell. In this manner, each fuel cell may be selected by the controller to output its waveform resulting from a test wave form injected into the fuel cell stack to the multi-channel EIS analyzer.

In block 706 the controller may control a matrix switch to align each selected fuel cell with its respective selected channel of the EIS analyzer. As an example, the controller may control a matrix switch, such as matrix switch 402, using controller 626, to connect each channel input of the EIS analyzer to a test output of one of the selected fuel cells.

In block 707 the controller may control the multi-channel EIS analyzer to inject a test waveform into the fuel cell stack. As an example, the controller may control a multi-channel EIS analyzer, such as EIS analyzer 404, to inject a test waveform into the fuel cell stack, such as fuel cell stack 106A via a connection, such as via connection 421 and/or load bank 408, to the fuel cell stack.

In block 708 the controller may control the multi-channel EIS analyzer to receive a waveform from on each of the selected channels from each respective selected subset of fuel cells (e.g., a single selected fuel cell) via the matrix switch and monitor the impedance response of each selected subset of fuel cells in response to the injected test waveform. In this manner, the electrochemical properties of the selected fuel cells may be compared and studied under the same operating environment and in response to the same one test waveform injected into the entire fuel cell stack. In an embodiment, the test waveform may be a full frequency sweep waveform. In another embodiment, the test waveform may be super positioned frequencies or standard ranges of frequencies to enable only particular regions of frequencies to be tested, such as 10 KHz, 8 KHz, 6 KHz, 4 KHz, 3 KHz, 2 KHz, 1 KHz, etc. The use of test waveforms focused towards testing particular regions of frequencies may enable the dynamic changes in electrochemical parameters with time at particular frequencies and different environments, such as fuel stream environments, to be monitored.

In block 710 the controller may determine a characteristic of each of the selected subset of fuel cells based at least in part on the impedance response of that fuel cell. As discussed above, the controller may use EIS monitoring to plot the real and imaginary parts of the measured impedances resulting from the injected test waveform and compare the plotted impedances to the known signatures of impedance responses of fuel cells with known characteristics. The known signatures of impedance responses of the fuel cells with known characteristics may be stored in a memory available to the controller. The stored known signatures of impedance responses of the fuel cells with known characteristics may be plots of the real and imaginary parts of the measured impedances of healthy fuel cells and damaged/degraded fuel cells derived from testing healthy (i.e., undamaged/un-degraded) and damaged/degraded fuel cells with various forms of damage (e.g., anode cracking) and/or degradation (e.g., cells operating in fuel starvation mode). The known characteristics may be correlated with the plots of the real and imaginary parts of the measured impedances stored in the memory. By matching the measured impedances to the known signatures of impedance responses, the current characteristics or state of the fuel cells may be determined as those characteristics correlated with the matching known signature of impedance response.

In optional block 712 the controller may adjust a setting of the fuel cell system based on the determined characteristic. For example, the controller may change (e.g., increase or decrease) a fuel flow, air flow, drawn current from fuel cells, and/or water flow into the fuel inlet stream or shut off of the entire fuel cell system or the module 12 of the system containing cells which exceeded the failure threshold for service or replacement based on the determined characteristic. Thus, step 712 may include any one or more of changing a fuel flow rate into the fuel cell system, changing an air flow rate into the fuel cell system, changing an amount of current drawn from the fuel cell system, changing an amount of water provided into a fuel inlet stream, or shutting off at least part of the fuel cell system for service or replacement. In this manner, impedance testing, such as EIS monitoring, may be used in a fuel cell system to adjust the operation of the fuel cell system based on current characteristics of the individual fuel cells.

The system and method of the embodiments of the invention allows impedance analysis to be performed faster, more efficient and without any human intervention, while enhancing the automation, ease of fuel cell selection, upgrade and execution. The system and method also allow the system operator to understand the system degradation pattern and health of fuel cell stack components in a fleet environment during fleet operation at a faster rate. The system and method also allow the system operator to understand the electrochemical parameters of the fuel cells during the sudden death of the fuel cells in the fleet.

EIS monitoring may be used to obtain various parameters and data regarding one or more fuel cells in the fuel cell system. Particularly, EIS may be used to determine the source of voltage losses, or polarizations, in a fuel cell system so that the losses may be minimized. There are three main types of polarization: ohmic polarization, activation polarization, and concentration polarization. Ohmic polarization is caused by the ohmic resistance of ions conducting through the electrolyte. Activation polarization is caused by electrochemical activation barriers at the anode and cathode. Concentration polarization is caused by the inability of gases to diffuse at high rates through the anode and cathode. The extent of concentration polarization is mainly based on the availability of reactants in the three phase boundary of the fuel cell (i.e. the region where fuel is utilized).

An EIS analyzer may be used to determine the contributions of various polarizations to voltage losses of a fuel cell system. For example, the EIS analyzer may be able to determine the ohmic resistance of one or more fuel cells, and thus the ohmic polarization. In another example, the EIS analyzer may be able to determine the fuel utilization percentage of one or more fuel cells, and thus the concentration polarization. However, to obtain these parameters it is usually necessary to conduct a wide frequency sweep (e.g. 10 kHz to 100 MHz) using the EIS analyzer. The collected data is used to construct an electrochemical circuit model and calculate estimated values for each of the polarizations from the circuit model. However, this process is complex and may take some time to complete. It would be preferable if the polarization values, including ohmic and concentration polarizations, could be obtained through a single frequency EIS measurement or a limited frequency range EIS measurement. This allows the measurement to be completed quickly, and may be used to implement dynamic adjustments in the fuel cell system based on the value of the ohmic or concentration polarization. This allows optimization of the efficiency of the fuel cell system, as well as ad hoc correction of problems that arise in the fuel cell system.

Various embodiments described herein disclose a method to measure the fuel utilization percentage, and thus the concentration polarization, of one or more fuel cells in a fuel cell system using only a single frequency EIS measurement. The fuel utilization of a fuel cell system may depend upon a number of variables, including the current drawn from the fuel cells, the imaginary component of the impedance of the fuel cells, the temperature of the fuel cells, the air utilization, and various other operating parameters. Thus although the imaginary impedance of the fuel cells may be varied by varying the frequency applied to the fuel cells by an EIS analyzer, it may be difficult to isolate the effect of the impedance on fuel utilization from the other parameters that also affect the fuel utilization.

Figure 8:
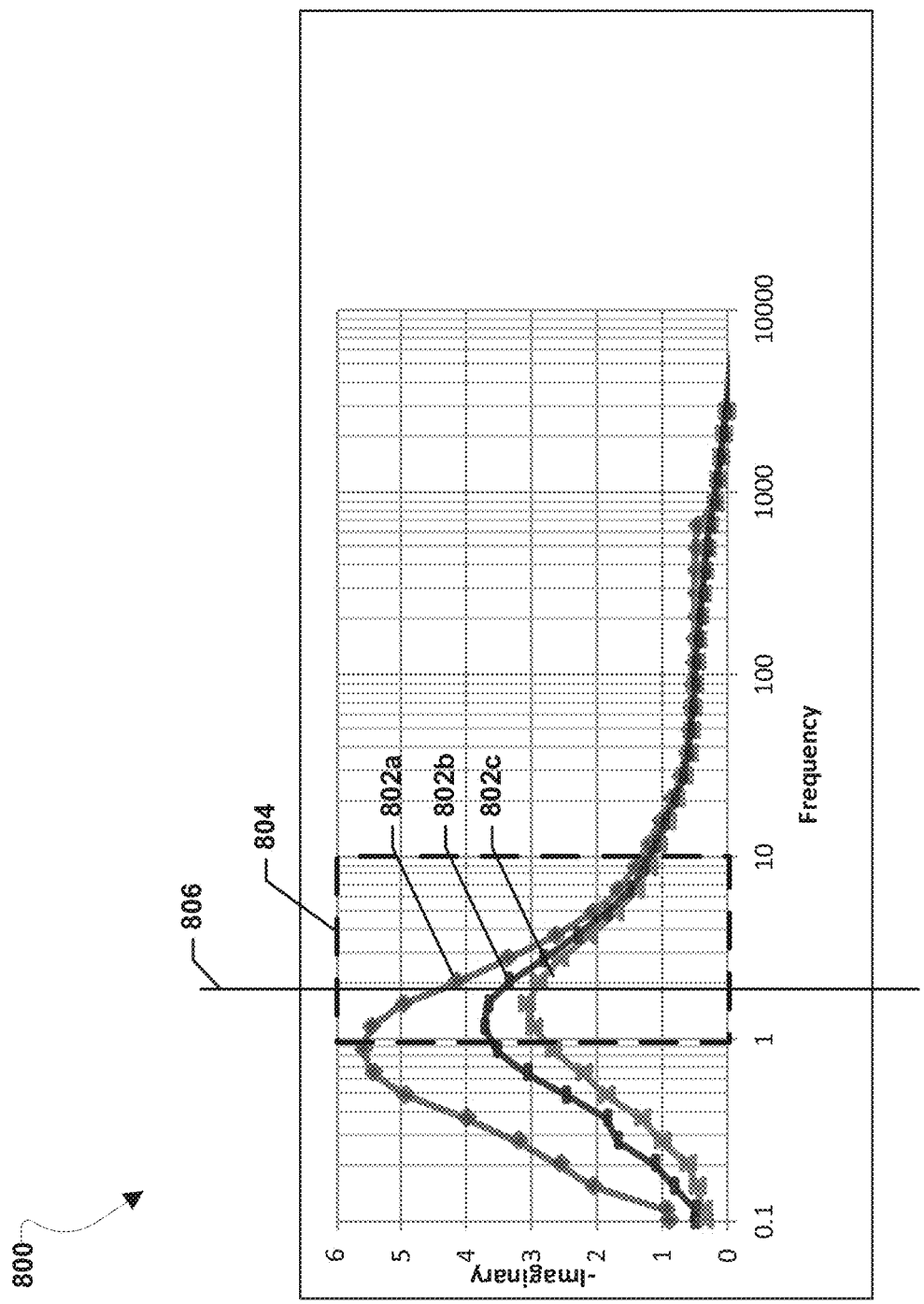
FIG. 8 is a graph showing the relationship between frequency and imaginary impedance for a set of fuel cells at different fuel utilizations.

FIG. 8 illustrates a log graph 800 plotting the frequency applied to a set of fuel cells (e.g. a fuel cell module, column, or segment) by an EIS analyzer, and the corresponding values of the imaginary impedance measured by the EIS analyzer. The graph 800 includes three plots 802a-802c, each plot corresponding to a known fuel utilization percentage. For example, the fuel utilization of plot 802a may be 90%, while the fuel utilization of plot 802b may be 86% and the fuel utilization of plot 802c may be 83%. For high frequency values, for example frequencies above 10 Hz, the graph 800 shows little variation in the imaginary impedance values of the plots 802a-802c, meaning that the imaginary impedance values do not strongly depend on fuel utilization values. However, for low frequencies, for example a frequency range 804 between 1 Hz and 10 Hz, the imaginary impedance values of the plots 802a-802c diverge. This means that the imaginary impedance values do strongly depend on fuel utilization values at low frequencies. Thus, a single low frequency EIS measurement, for example at frequency 806, may be able to differentiate sets of fuel cells having different fuel utilizations, and the correlation may be isolated from other parameters that also affect the fuel utilization. For example, at frequency 806 the imaginary impedance may depend only on fuel utilization and current drawn from the set of fuel cells, but not on temperature, air utilization, or other parameters.

The graph 800 may be obtained by applying a range of frequencies, for example a full frequency sweep, by an EIS analyzer to a set of fuel cells (e.g. a fuel cell module, column, or segment) at one or more known fuel utilization values. The fuel utilization values may be single pass fuel utilization values. A single pass fuel utilization value represents the fuel utilization during a single cycle of fuel through the set of fuel cells (i.e. what the set of fuel cells experiences locally based on incoming and recycled fuel). The single pass fuel utilization may include the utilized amount of fresh fuel that enters the set of fuel cells (e.g. the fuel entering through the fuel inlet line 329 in FIG. 3) combined with the recycled fuel that is pumped back into the inlet of the set of fuel cells (e.g. through the humidified anode exhaust stream conduit 3121 in FIG. 3). The EIS analyzer may vary the temperature, air utilization, and other operational parameters over multiple sweeps of the same fuel utilization rate and measure the imaginary impedance of the set of fuel cells while the operational parameters are varied. The EIS analyzer or controller may then determine a single frequency 806 where the fuel utilization rate is highly dependent on imaginary impedance but not on the other operational parameters. This single frequency 806 may be used in a single frequency measurement by the EIS analyzer to obtain a value for fuel utilization. For example, the single frequency may be between 1 Hz and 2 Hz.

A regression model may be developed to determine the relationship between imaginary impedance and fuel utilization rate using the data obtained by the EIS analyzer. For example, the model may take as inputs the current drawn from the set of fuel cells, and the imaginary impedance data for the set of fuel cells at a single, specific frequency. At this frequency, the fuel utilization rate of the set of fuel cells is highly dependent on imaginary impedance and current, but not on other operating parameters. The output of the regression model may be the single pass fuel utilization rate, expressed as a percentage. An example of an equation derived from the regression model is shown below:

$$SPU = a1 + (b1*I) + \left(\left(\frac{c1}{N}\right)*(-Zi) + \left((-Zi - (c2*N))*(I - b2)*\left(-\frac{a2}{N}\right)\right)\right)$$

where SPU is the single pass fuel utilization in percentage for a set of fuel cells, I is the current drawn from the set of fuel cells in Amperes, Zi is the imaginary impedance in $\Omega*cm^2$, N is the number of fuel cells in the set of fuel cells, and a1, b1, c1, a2, b2, and c2 are constants that depend on the specific fuel cell system. The derived fuel utilization percentage for the set of fuel cells may be extrapolated to the entire fuel cell system or to subsets of fuel cells within the fuel cell system by using multiplication factors.

After the regression model and equation are determined, the relationship between the imaginary impedance and the fuel utilization percentage may be stored as a lookup table, graph, or other type of data in the memory of a controller of the fuel cell system. Thus a regression model relating imaginary impedance to fuel utilization at a particular frequency may be developed and stored for each specific type of fuel cell system. Afterwards, the data may be used to obtain current fuel utilization values by a single frequency EIS measurement of the fuel cell system. This allows the fuel cell system to dynamically estimate the current fuel cell utilization of the fuel cell system and act accordingly.

Figure 9:
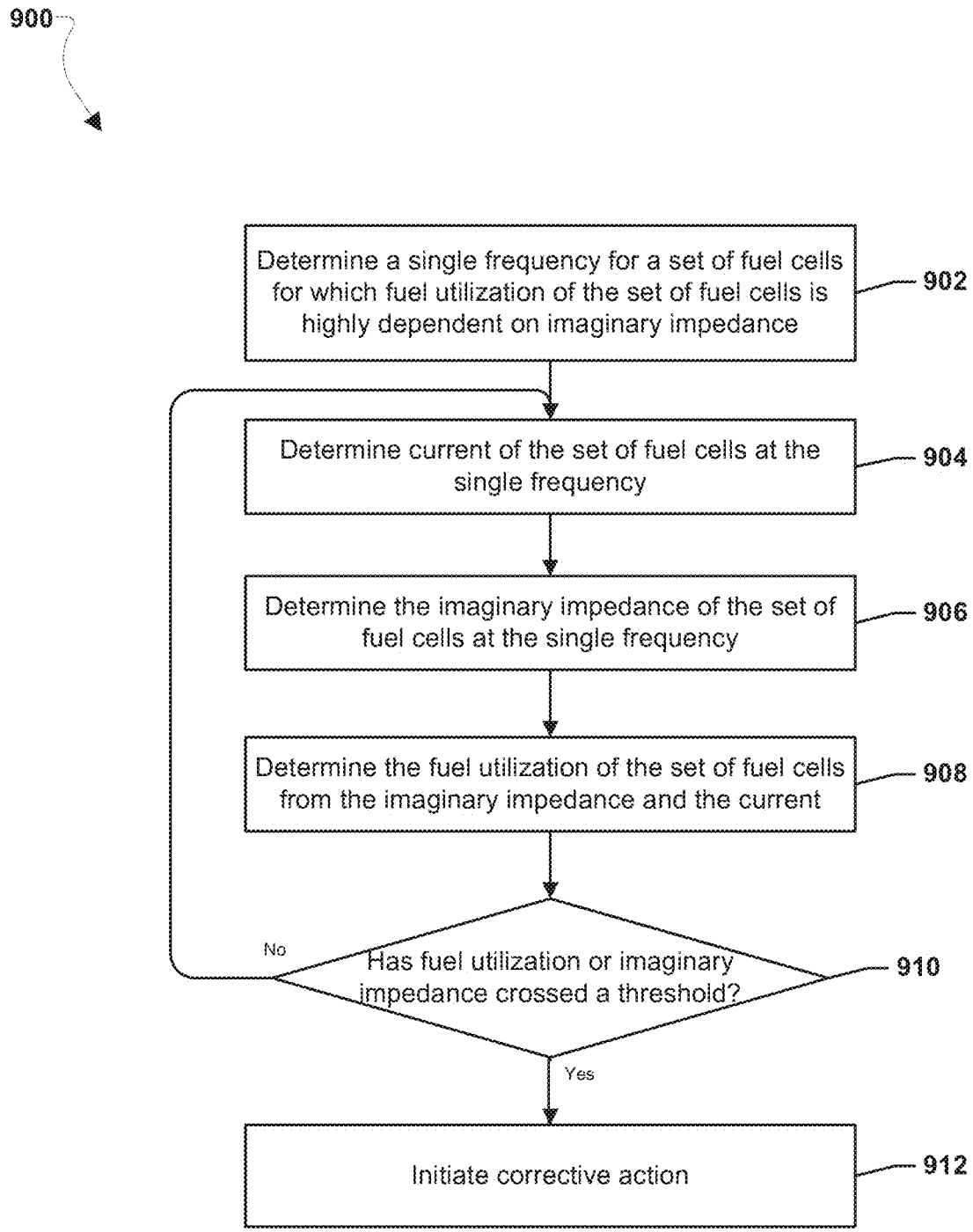
FIG. 9 is a process flow diagram illustrating an embodiment method for monitoring a set of fuel cells.

FIG. 9 illustrates a method 900 for monitoring a fuel cell system. The method 900 may be performed by a controller that controls a fuel cell system, for example the controller 412 and/or computer 411 in FIG. 4. The fuel cell system includes an EIS analyzer, such as the system 400 with EIS analyzer 404 in FIG. 4. The EIS analyzer may be configured to conduct EIS measurements on a set of fuel cells, such as a fuel cell module, column, or segment. The determined fuel utilization may be the single pass fuel utilization rate for the set of fuel cells. The fuel cell system may also include the matrix switch 402. However, any suitable EIS analyzer, with or without a matrix switch, may be used in conjunction with the method 900.

In block 902, the controller may determine a single frequency to apply to a set of fuel cells, wherein the fuel utilization of the set of fuel cells is highly dependent on imaginary impedance at the single frequency. The single frequency may be determined as described above with reference to FIG. 8. For example, an EIS analyzer may apply a range of frequencies to the set of fuel cells for a number of known fuel utilization values. The EIS analyzer and the controller of the fuel cell system may vary, at each frequency in the range of frequencies, operational parameters of the set of fuel cells and measure the imaginary impedance of the set of fuel cells at each frequency in the range of frequencies and for each of the plurality of known fuel utilization values while the operational parameters are varied. The EIS analyzer or controller may then determine the single frequency as the frequency in the range of frequencies at which the plurality of known fuel utilization values are highly dependent on imaginary impedance and have low dependence on the operational parameters. The single frequency may be between 1 Hz and 2 Hz. Alternatively, the single frequency may have been previously determined and stored in memory, and the controller may access the memory in block 902 to obtain the single frequency.

In block 904, the controller may determine the current drawn from the set of fuel cells at the single frequency. In block 906, the controller may determine the imaginary impedance of the set of fuel cells at the single frequency by measuring the imaginary impedance using the EIS analyzer. The EIS analyzer may conduct the imaginary impedance measurement by measuring the total impedance and isolating the imaginary component of the impedance.

In block 908, the controller may determine the fuel utilization, or concentration polarization, of the set of fuel cells from the measured imaginary impedance and current at the single frequency. The controller may utilize a regression model that defines the relationship between imaginary impedance and fuel utilization, or any form of data derived from the regression model, such as graphs or lookup tables. The determined fuel utilization may be the single pass fuel utilization percentage for the set of fuel cells. Alternatively, the controller may not determine the fuel utilization or concentration polarization of the set of fuel cells but instead use the measured imaginary impedance to determine whether corrective actions are necessary (i.e. skip the operations in block 908).

In determination block 910, the controller may determine whether the derived fuel utilization, or concentration polarization, crosses a threshold. The threshold may represent an undesired concentration polarization or voltage loss level. Alternatively, the controller may determine whether the measured imaginary impedance crosses a threshold (i.e. skip the conversion from imaginary impedance to fuel utilization or concentration polarization) in determination block 910. In response to determining that the derived fuel utilization, concentration polarization, or imaginary impedance has not crossed the threshold (i.e. determination block 910="No"), the controller may continue to measure the output current (i.e. current drawn from the set of fuel cells) and imaginary impedance of the set of fuel cells in blocks 904 and 906. In other words, the controller may continue to monitor the fuel utilization value until it drops below the threshold.

In response to determining that the derived fuel utilization, concentration polarization, or imaginary impedance has crossed the threshold (i.e. determination block 910="Yes"), the controller may initiate a corrective action in block 912. The corrective action may include initiating a stack recovery sequence, varying the fuel supplied to the fuel cell system (e.g. increasing the amount of fuel supplied to the set of fuel cells and/or amount of fuel recycled by increasing the output of the anode recycle blower 3123 in FIG. 3), varying the output current from the set of fuel cells, adjusting various components in the fuel cell system (e.g. components illustrated in FIG. 3, such as varying the speed of the air blower to vary the amount of input air), and/or sounding an alarm for an operator to take action. In this manner, method 900 provides a way to dynamically estimate the fuel utilization of a set of fuel cells and take corrective action if necessary to counteract excessive voltage loss due to concentration polarization.

EIS measurements may also be used to estimate the ohmic resistance, and thus the voltage loss due to ohmic polarization, of a fuel cell system. Various embodiments described herein disclose a method to measure the ohmic resistance of one or more fuel cells in a fuel cell system using only a limited frequency range EIS measurement. The ohmic resistance of a fuel cell system may depend upon a number of variables, including the real component of the impedance of the fuel cells, the temperature of the fuel cells, the air utilization, and various other operating parameters. Thus although the impedance of the fuel cells may be varied by varying the frequency applied to the fuel cells by an EIS analyzer, it may be difficult to isolate the effect of the impedance on ohmic resistance from the other parameters that also affect ohmic resistance.

Figure 10:
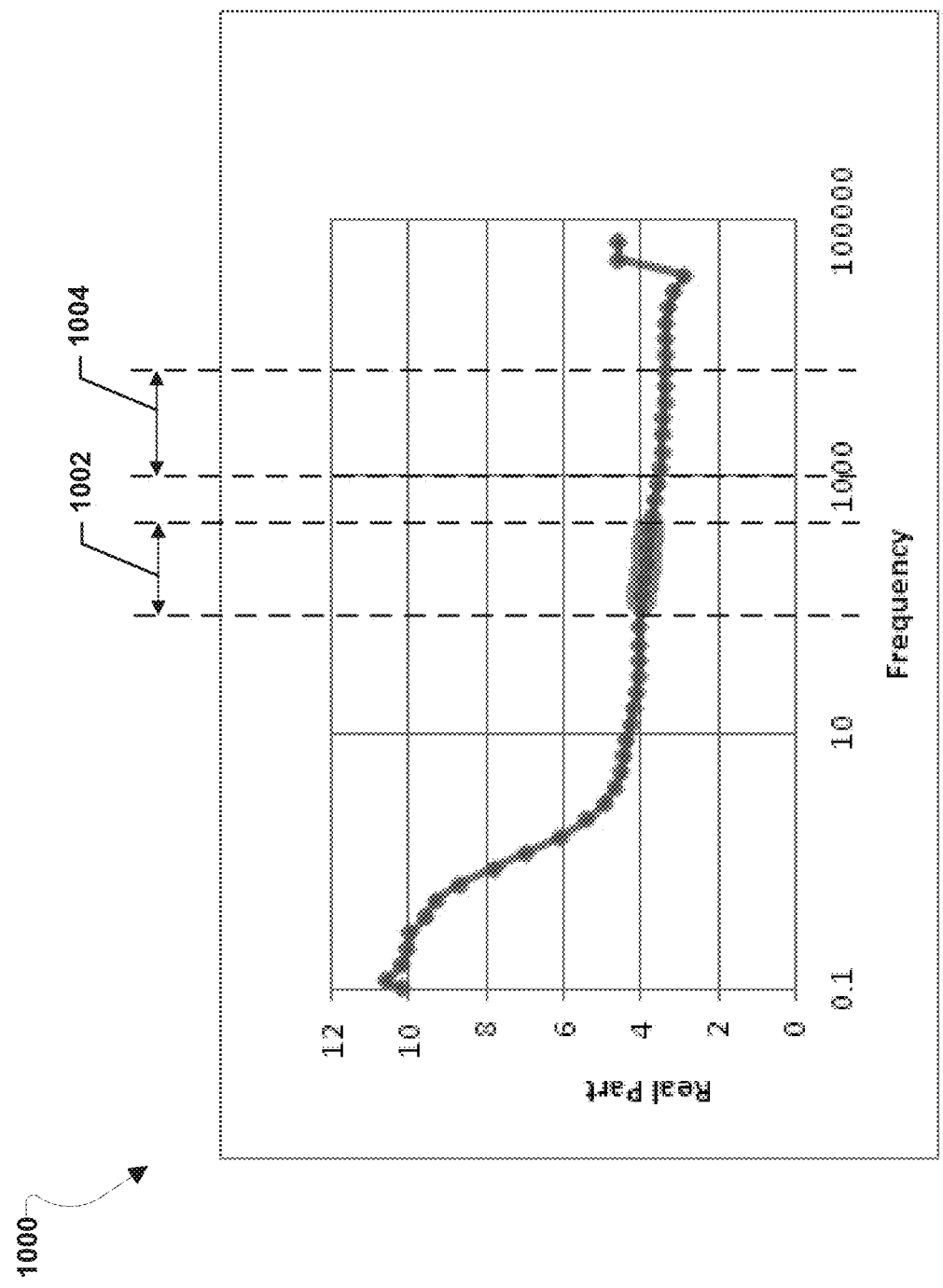
FIG. 10 is a graph showing the relationship between frequency and real impedance for a set of fuel cells over a wide frequency range.

FIG. 10 illustrates a log graph 1000 plotting the frequency applied to a set of fuel cells (e.g. a fuel cell module, column, or segment) by an EIS analyzer, and the corresponding values of the real impedance measured by the EIS analyzer multiplied by the active area of each fuel cell. At a limited frequency range 1002 (e.g. in between 10 Hz and 1 kHz), the plot of the real impedance versus frequency has a certain slope. However, a different frequency range 1004 (e.g. in between 1 kHz to 100 kHz) may be the frequency range of interest during steady state operation of the fuel cell system. At the frequency range of interest 1004, the slope of the real impedance versus frequency may be similar to the slope in the limited frequency range 1002. It may be easier to obtain EIS impedance measurements at lower frequencies, so it is possible to utilize the slope of the plot in the limited frequency range 1002 to obtain information about the real impedance at the frequency range of interest 1004, for example by extrapolation of a logarithmic fit equation. For example, the EIS measurement may only be made on a set of fuel cells at a DC/DC converter located in the field where the fuel cells are deployed. The EIS analyzer may only be able to measure within the limited frequency range 1002 at the DC/DC converter cell, and so cannot measure the frequency range of interest 1004 in the field.

The limited frequency range 1002 may be obtained by plotting the real impedance of the set of fuel cells over a wide frequency sweep using an EIS analyzer. The limited frequency range may be the frequency range at which the slope of the real impedance versus frequency is substantially the same as the slope of the real impedance versus frequency of a frequency range of interest. At the limited frequency range 1002, the real impedance of the set of fuel cells may have low dependence on operational parameters of the fuel cell system such as fuel utilization and air utilization. The controller of the fuel cell system may utilize the real impedance measurements over the limited frequency range 1002 to determine the real impedance, and thus the ohmic resistance, for frequencies in the frequency range of interest 1004.

The controller may determine a relationship between the real impedance measured by the EIS analyzer for a specific range of frequencies and real impedances for frequencies outside the specific range of frequencies. The controller may derive a log or linear fit equation that describes the relationship between the frequency in the limited frequency range 1002 and the real impedance. This equation, having a particular slope, may be used to estimate the real impedance for frequencies in the frequency range of interest 1004. An example of a log fit equation is shown below:

$$Zr = s*ln(f) + b$$

where Zn is the real impedance, f is the frequency in Hz, and s and b are constants that depend on the specific fuel cell system. The constant s represents the slope of the plot between frequency and real impedance in the limited frequency range 1002. The slope in the limited frequency range 1002 may be substantially similar to the slope in the frequency range of interest 1004, so the above equation may be used to determine the real impedance of frequencies in the frequency range of interest 1004 without conducting any EIS measurements in the frequency range of interest 1004.

Figure 11:
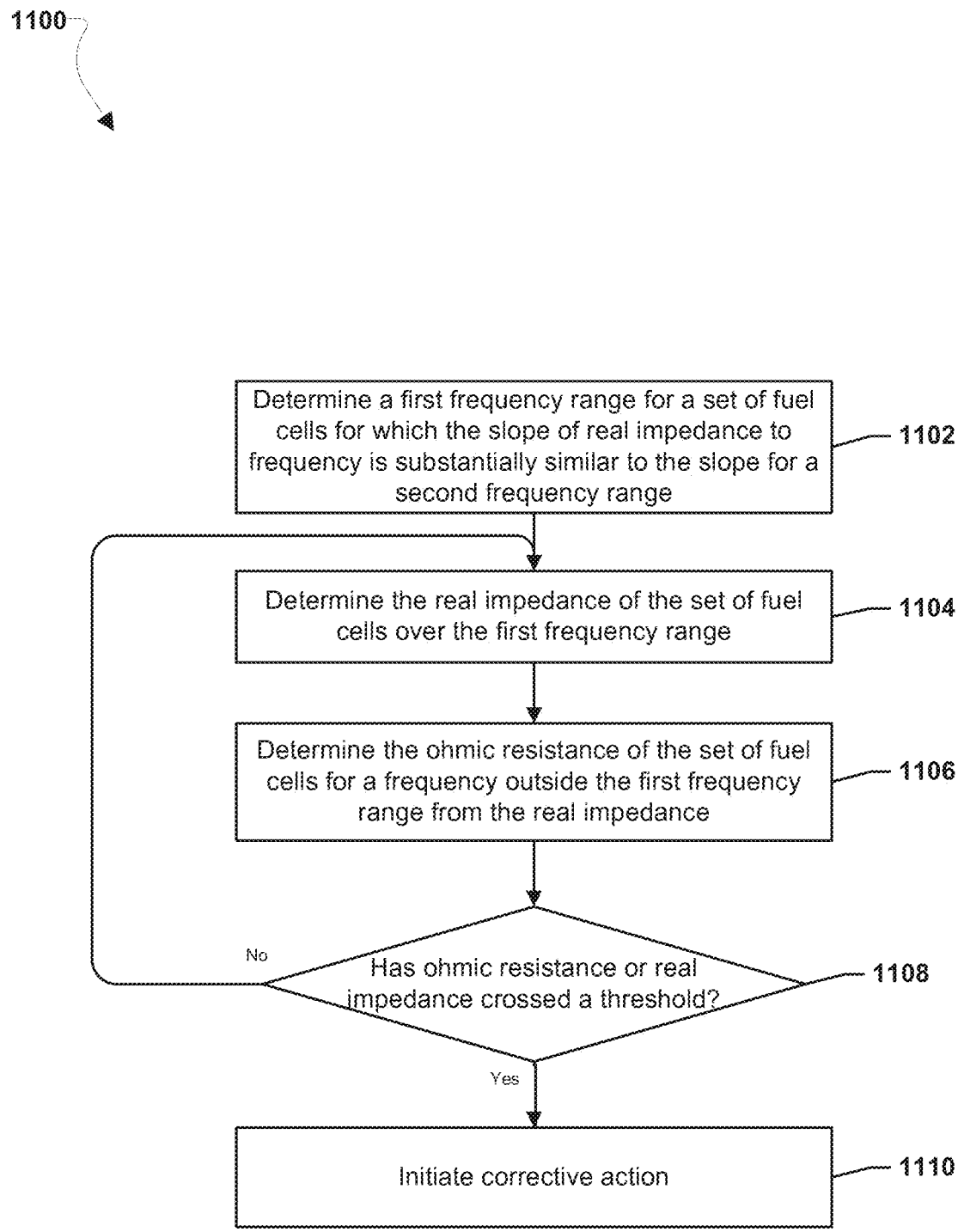
FIG. 11 is a process flow diagram illustrating an embodiment method for monitoring a set of fuel cells.

FIG. 11 illustrates a method 1100 for monitoring a fuel cell system. The method 1100 may be performed by a controller that controls a fuel cell system, for example the controller 412 and/or computer 411 in FIG. 4. The fuel cell system includes an EIS analyzer 404, such as the system 400 with EIS analyzer 404 in FIG. 4. The EIS analyzer may be configured to conduct EIS measurements on a set of fuel cells, such as a fuel cell module, column, or segment. The fuel cell system may also include the matrix switch 402. However, any suitable EIS analyzer, with or without a matrix switch, may be used in conjunction with the method 1100.

In block 1102, the controller may determine a first frequency range to apply to a set of fuel cells. The slope of the real impedance of the set of fuel cells versus frequency in the first frequency range may be substantially the same as the slope of the real impedance of the set of fuel cells versus frequency of a second frequency range outside the first frequency range. The first frequency range may be a limited, low frequency range, for example between 10 Hz to 1000 Hz. The second frequency range may be a higher frequency range, for example between 1000 Hz and 100,000 Hz. The first frequency range may be determined as described above with reference to FIG. 10. That is, the first frequency range may be obtained by plotting the real impedance of the set of fuel cells over a wide frequency sweep using an EIS analyzer, and then selecting low frequency range that has a real impedance slope substantially similar to higher frequency ranges. Alternatively, the first frequency range may have been previously determined and stored in memory, and the controller may access the memory in block 1102 to obtain the first frequency range.

In block 1104, the controller may determine the real impedance of the set of fuel cells over the first frequency range by measuring the real impedance using the EIS analyzer. The EIS analyzer may conduct the real impedance measurement by measuring the total impedance and isolating the real component of the impedance.

In block 1106, the controller may determine the ohmic resistance, or the ohmic polarization of the set of fuel cells for a frequency of interest outside the first frequency range from the measured real impedance over the first frequency range. The controller may utilize a log or linear fit equation as described above to determine the relationship between the ohmic resistance of the set of fuel cells and frequency. For example, the measured real impedance over the first range of frequencies may be used to derive a log fit equation, where the slope of the equation is substantially similar to the slope of the relationship between real impedance and frequency outside the first frequency range, and in particular the frequency of interest. The frequency of interest may be within the second frequency range. The first frequency range may be the frequency range that can be measured by an EIS analyzer in the field, while the secondary frequency range may be a frequency range that allows the ohmic polarization to be determined. The controller may also utilize any form of data derived from the log fit equation, such as graphs or lookup tables, to determine the ohmic resistance of the set of fuel cells from the measured real impedance. Alternatively, the controller may not determine the ohmic resistance or ohmic polarization of the set of fuel cells but instead use the measured real impedance to determine whether corrective actions are necessary (i.e. skip the operations in block 1106).

In determination block 1108, the controller may determine whether the derived ohmic resistance, or ohmic polarization, crosses a threshold. The threshold may represent an undesired ohmic polarization or voltage loss level. Alternatively, the controller may determine whether the measured real impedance crosses a threshold (i.e. skip the conversion from real impedance to ohmic resistance or ohmic polarization) in determination block 1108. In response to determining that the derived ohmic resistance, ohmic polarization, or real impedance has not crossed the threshold (i.e. determination block 1108="No"), the controller may continue to measure the real impedance of the set of fuel cells in block 1104. In other words, the controller may continue to monitor the ohmic resistance value until it crosses the threshold.

In response to determining that the derived ohmic resistance, ohmic polarization, or real impedance has crossed the threshold (i.e. determination block 1108="Yes"), the controller may initiate a corrective action in block 1110. The corrective action may include initiating a stack recovery sequence, varying the fuel supplied to the fuel cell system, varying the output current from the set of fuel cells, adjusting various components in the fuel cell system (e.g. components illustrated in FIG. 3, such as varying the speed of the air blower to vary the amount of input air), and/or sounding an alarm for an operator to take action. In this manner, method 1100 provides a way to dynamically estimate the ohmic resistance of a set of fuel cells and take corrective action if necessary to counteract excessive voltage loss due to ohmic polarization. In some embodiments, method 1100 and method 900 may be performed at the same time (i.e. both the fuel utilization and ohmic resistance may be determined from an EIS impedance measurement).

Figure 12:
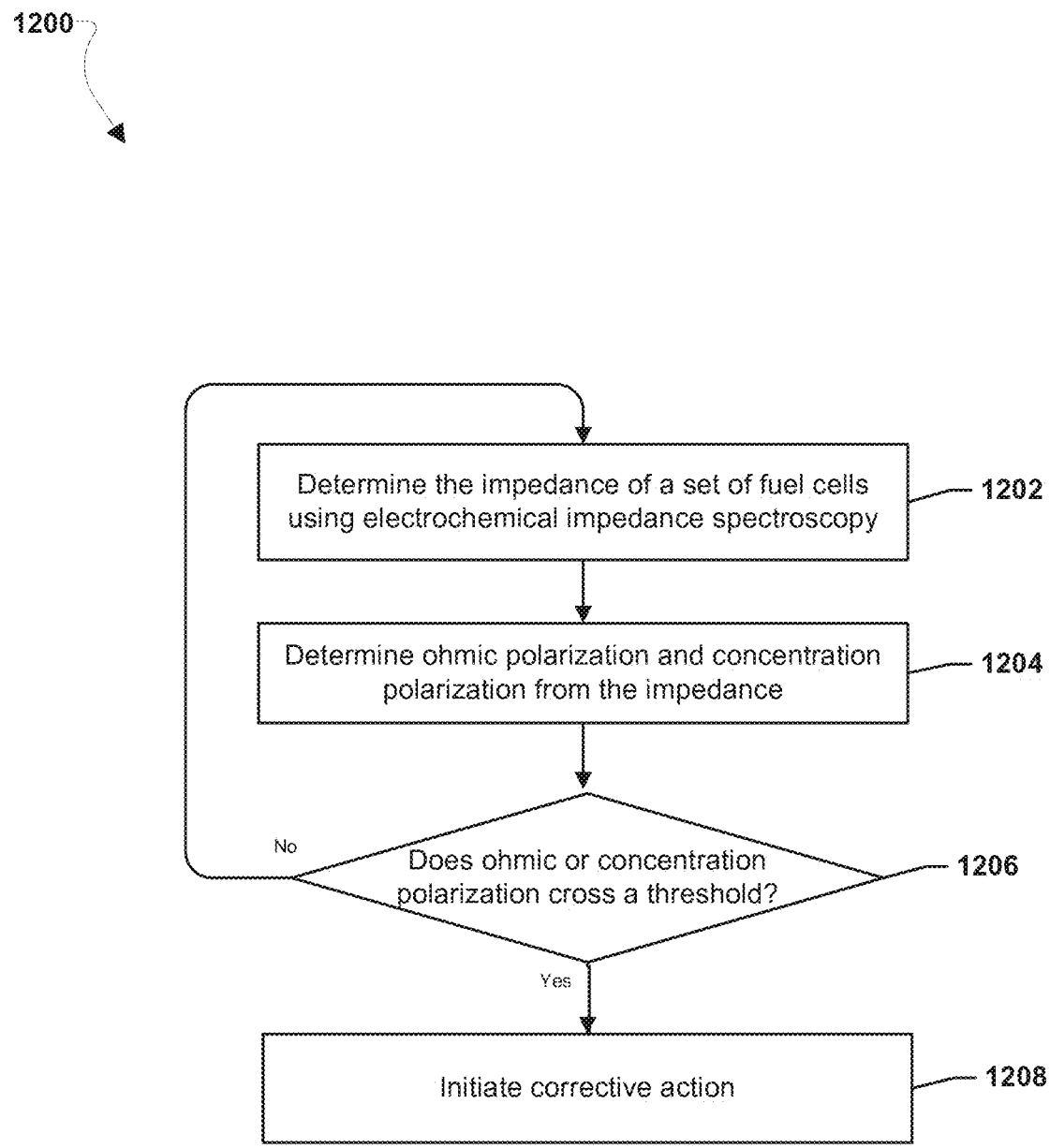
FIG. 12 is a process flow diagram illustrating an embodiment method for monitoring a set of fuel cells.

FIG. 12 illustrates a method 1200 for monitoring a fuel cell system. The method 1200 may be performed by a controller that controls a fuel cell system, for example the controller 412 and/or computer 411 in FIG. 4. The fuel cell system includes an EIS analyzer 404, such as the system 400 with EIS analyzer 404 in FIG. 4. The EIS analyzer may be configured to conduct EIS measurements on a set of fuel cells, such as a fuel cell module, column, or segment. The fuel cell system may also include the matrix switch 402. However, any suitable EIS analyzer, with or without a matrix switch, may be used in conjunction with the method 1200.

In block 1202, the controller may determine the impedance of a set of fuel cells using electrochemical impedance spectroscopy. The measurement may be made at a single frequency and/or a subrange of frequencies. The concentration polarization of the set of fuel cells may be dependent on imaginary impedance at the single frequency, while the ohmic polarization of the set of fuel cells is determined from a relationship between the real component of the impedance and the subrange of frequencies.

In block 1204, the controller may determine the ohmic polarization and concentration polarization of the set of fuel cells from the determined impedance. The concentration polarization may be determined from the imaginary component of the impedance determined at the single frequency. For example, the controller may utilize a regression model that defines the relationship between imaginary impedance and concentration polarization, or any form of data derived from the regression model, such as graphs or lookup tables. The ohmic polarization may be determined from the real component of the impedance determined at the subrange of frequencies. For example, the controller may utilize a log fit equation to determine the relationship between the ohmic polarization of the set of fuel cells and frequency, or any form of data derived from the log fit equation, such as graphs or lookup tables.

In determination block 1206, the controller may compare the ohmic polarization to a first threshold and the concentration polarization to a second threshold to determine whether either parameter crosses their respective threshold. The first threshold may represent an undesired ohmic polarization or voltage loss level, and the second threshold may represent an undesired concentration polarization or voltage loss level. In response to determining that neither the ohmic polarization nor the concentration polarization crosses their respective threshold (i.e. determination block 1206="No"), the controller may continue to determine the impedance of the set of fuel cells. In other words, the controller may continue to monitor the ohmic and concentration polarizations until either one crosses their respective threshold.

In response to determining that either the ohmic polarization or the concentration polarization, or both, have crossed their respective threshold (i.e. determination block 1206="Yes"), the controller may initiate a corrective action in block 1208. The corrective action may include initiating a stack recovery sequence, varying the fuel supplied to the fuel cell system (e.g. increasing the amount of fuel supplied to the set of fuel cells and/or amount of fuel recycled by increasing the output of the anode recycle blower 3123 in FIG. 3), varying the output current from the set of fuel cells, adjusting various components in the fuel cell system (e.g. components illustrated in FIG. 3, such as varying the speed of the air blower to vary the amount of input air), and/or sounding an alarm for an operator to take action. In this manner, method 1200 provides a way to dynamically estimate the ohmic and concentration polarizations of a set of fuel cells and take corrective action if necessary to counteract excessive voltage loss due to ohmic or concentration polarizations.

The foregoing method descriptions and diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more diagrams have been used to describe exemplary embodiments. The use of diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements may be implemented using computing devices (such as computer) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use the described embodiment. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope consistent with the following claims and the principles and novel features disclosed herein.

What is claimed is:

1. A method of monitoring a fuel cell system performed by a controller, comprising:

determining a first frequency range to apply to a set of fuel cells, wherein the slope of the real impedance of the set of fuel cells versus frequency in the first frequency range is substantially the same as the slope of the real impedance of the set of fuel cells versus frequency of a second frequency range outside the first frequency range;

determining the real impedance of the set of fuel cells over the first frequency range using electrochemical impedance spectroscopy;

comparing the real impedance of the set of fuel cells to a first threshold; and initiating a corrective action when the real impedance crosses the first threshold.

2. The method of claim 1, further comprising determining ohmic resistance of the set of fuel cells from the real impedance.

3. The method of claim 2, wherein determining ohmic resistance of the set of fuel cells for the second frequency range from the real impedance of the first frequency range comprises determining a relationship between the real impedance of the set of fuel cells and frequency.

4. The method of claim 3, wherein the relationship between the real impedance of the set of fuel cells and frequency is determined through a log or linear fit equation.

5. The method of claim 3, wherein the relationship between the real impedance of the set of fuel cells and frequency is determined through a lookup table.

6. The method of claim 2, further comprising:

comparing the ohmic resistance of the set of fuel cells to a second threshold; and initiating the corrective action when the ohmic resistance crosses the second threshold.

7. The method of claim 1, wherein the real impedance of the set of fuel cells over the first frequency range has more dependence on ohmic resistance than on operational parameters.

8. The method of claim 7, wherein the operational parameters include at least one of fuel utilization and air utilization.

9. The method of claim 1, wherein the set of fuel cells comprises a fuel cell module, a fuel cell column, or a fuel cell segment.

10. The method of claim 1, wherein the first frequency range is within the range of 10 hertz to 1000 hertz.

11. The method of claim 1, wherein the second frequency range is within the range of 1000 hertz to 100,000 hertz.

12. The method of claim 1, wherein the corrective action comprises one or more of initiating a stack recovery sequence, varying fuel supplied to the set of fuel cells, varying output current from the set of fuel cells, adjusting a component in the fuel cell system, and sounding an alarm for an operator to take action.

13. The method of claim 1, further comprising:

determining imaginary impedance of the set of fuel cells at a single frequency using electrochemical impedance spectroscopy;

comparing the imaginary impedance of the set of fuel cells to a third threshold; and initiating the corrective action when the imaginary impedance crosses the third threshold.

14. The method of claim 1, wherein a DC/DC converter in the set of fuel cells is measured to determine the real impedance in the first frequency range while the set of fuel cells is generating power.

* * * * *